United States Patent
Yamamoto et al.

(10) Patent No.: US 11,492,240 B2
(45) Date of Patent: Nov. 8, 2022

(54) FLOATING UNIT

(71) Applicant: Daifuku Co., Ltd., Osaka (JP)

(72) Inventors: Yutaka Yamamoto, Osaka (JP);
Yukichi Tamura, Osaka (JP);
Hidetoshi Takahashi, Tokyo (JP);
Rikki Ito, Tokyo (JP)

(73) Assignee: Daifuku Co., Ltd., Osaka (JP)

( * ) Notice: Subject to any disclaimer, the term of this patent is extended or adjusted under 35 U.S.C. 154(b) by 63 days.

(21) Appl. No.: 17/198,533

(22) Filed: Mar. 11, 2021

(65) Prior Publication Data

US 2021/0285488 A1   Sep. 16, 2021

(30) Foreign Application Priority Data

Mar. 12, 2020   (JP) .............. JP2020-042707

(51) Int. Cl.
*B66F 7/06* (2006.01)
*B66F 7/28* (2006.01)
*B66F 11/04* (2006.01)

(52) U.S. Cl.
CPC ............... *B66F 7/065* (2013.01); *B66F 7/28* (2013.01); *B66F 11/042* (2013.01)

(58) Field of Classification Search
CPC ......... B66F 7/00; B66F 7/0625; B66F 7/065; B66F 7/0666; B66F 7/0658; B66F 7/0675; B66F 7/0683; B66F 7/08; B66F 7/085; B66F 7/28; B66F 11/042; F16C 19/50; F16C 2326/00; B61D 15/00; B65G 41/02
USPC .............. 254/122, 124, 126; 269/60
See application file for complete search history.

(56) References Cited

U.S. PATENT DOCUMENTS 8,632,249 B2 * 1/2014 Iguchi ............... F16C 29/04
                                                                384/49
9,593,001 B2 * 3/2017 Frizzell ............... B66F 7/20

FOREIGN PATENT DOCUMENTS

JP   S-63229234 A  *  9/1988
JP   2008126762 A      6/2008
JP   2017101794 A  *  6/2017

OTHER PUBLICATIONS

JPS-6322934—Machine Translation (Year: 1988).*
JP-2017101794—Machine Translation (Year: 2017).*

* cited by examiner

*Primary Examiner* — Lee D Wilson
*Assistant Examiner* — Alberto Saenz
(74) *Attorney, Agent, or Firm* — The Webb Law Firm

(57) ABSTRACT

In a floating unit, a floating mechanism is provided with: a rolling portion that includes a holding portion fixed to one of a first member and a second member, a sphere held by the holding portion so as to be rotatable in all directions; and an opposing portion that is fixed to the other one of the first member and the second member, and has an abutment surface that abuts against the sphere. The abutment surface includes an inclined surface that is formed, over the entire region of the abutment surface in a circumferential direction around a reference position, so as to come close to a side, in the vertical direction, on which the sphere is arranged, while extending outward in the horizontal direction from the reference position.

7 Claims, 15 Drawing Sheets

FLOATING UNIT

CROSS-REFERENCE TO RELATED APPLICATION

This application claims priority to Japanese Patent Application No. 2020-042707 filed Mar. 12, 2020, the disclosure of which is hereby incorporated by reference in its entirety.

BACKGROUND OF THE INVENTION

1. Field of the Invention

The present invention relates to a floating unit in which a first member is configured to be movable relative to a second member.

2. Description of the Related Art

An example of such a floating unit is disclosed in JP 2008-126762A below. Hereinafter, in the Description of the Related Art, the reference numerals used in JP 2008-126762A are cited in parentheses.

In the floating unit of JP 2008-126762A, a first member (3) is coupled to a second member (2) via a pair of helical compression springs (6) provided on the two sides of the first member in a horizontal direction. Upon application of an external force in the horizontal direction, the first member (3) moves relative to the second member (2) in the horizontal direction. Then, when the external force no longer acts, the first member (3) returns to the initial position due to the restoring force of the helical compression springs (6).

SUMMARY OF THE INVENTION

Meanwhile, in a floating unit as described above, a pair of helical compression springs need to be aligned in the horizontal direction so that the direction in which the helical compression springs expand and contract matches the horizontal direction. Accordingly, there is the problem that the size of the floating unit in the horizontal direction is likely to be too large.

Also, in the floating unit as described above, the horizontal relative movement range of the first member with respect to the second member is limited to a range (range of expansion and contraction) that is less than or equal to a difference between the natural length and the solid length of one helical compression spring. There is also the problem that it is difficult to secure a large horizontal relative movement range of the first member with respect to the second member, compared to a horizontal range in which the pair of helical compression springs are aligned in the horizontal direction.

Therefore, there is a demand for realizing a floating unit whose size can be reduced in the horizontal direction and that can easily secure a large horizontal relative movement range of a first member with respect to a second member.

In view of the above-described circumstances, the characteristic feature of a floating unit is such that it includes:
a first member;
a second member arranged so as to be opposed to the first member from below; and
a floating mechanism that connects the first member and the second member so that the first member moves relative to the second member in a horizontal direction and a vertical direction, and the first member rotates relative to the second member around an axis along the vertical direction;
wherein the floating mechanism includes:
a rolling portion that includes a holding portion fixed to one of the first member and the second member, and a sphere held by the holding portion so as to be rotatable in all directions; and
an opposing portion that is fixed to the other one of the first member and the second member, and has an abutment surface that abuts against the sphere,
the abutment surface includes an inclined surface that is formed, over the entire region of the abutment surface in a circumferential direction around a reference position, so as to come close to a sphere arrangement side, which is a side in the vertical direction on which the sphere is arranged, while extending outward in the horizontal direction from the reference position, and
the rolling portion and the opposing portion are arranged so that a load having a component in the vertical direction acts on a portion in which the abutment surface abuts against the sphere.

According to this characteristic feature, the rolling portion and the opposing portion that constitute the floating mechanism are arranged so as to be opposed to each other in the vertical direction between the first member and the second member in the vertical direction. Also, as a result of the sphere of the rolling portion rolling on the abutment surface of the opposing portion that has the inclined surface, the first member can move relative to the second member in the horizontal direction and the vertical direction, and the first member can rotate relative to the second member around an axis along the vertical direction. Here, the abutment surface has the above-described inclined surface, and a load having a component in the vertical direction acts on a portion in which the abutment surface abuts against the sphere. Accordingly, if the first member is moved relative to the second member from the initial position, and the sphere is in a state of being opposed to the inclined surface, a load will act on the sphere in a direction in which the first member returns to the reference position along the inclined surface. The floating mechanism thus generates a restoring force in a direction in which the first member is returned to the initial position. According to this configuration, the floating mechanism arranged between the first member and the second member in the vertical direction enables the first member to appropriately move relative to the second member, and can appropriately generate a restoring force for returning the first member to the initial position. Therefore, it is possible to suppress the size of the floating unit in the horizontal direction, as compared to a configuration in which the floating mechanism is aligned with the first member in the horizontal direction.

Also, as described above, since the rolling portion and the opposing portion are arranged between the first member and the second member in the vertical direction, it is easy to secure a large size of the abutment surface of the opposing portion in the horizontal direction. Accordingly, it is easy to secure a large movement range of the sphere on the abutment surface in the horizontal direction. That is to say, it is easy to secure a large relative movement range of the first member with respect to the second member in the horizontal direction.

DETAILED DESCRIPTION OF THE INVENTION

Figure 1:
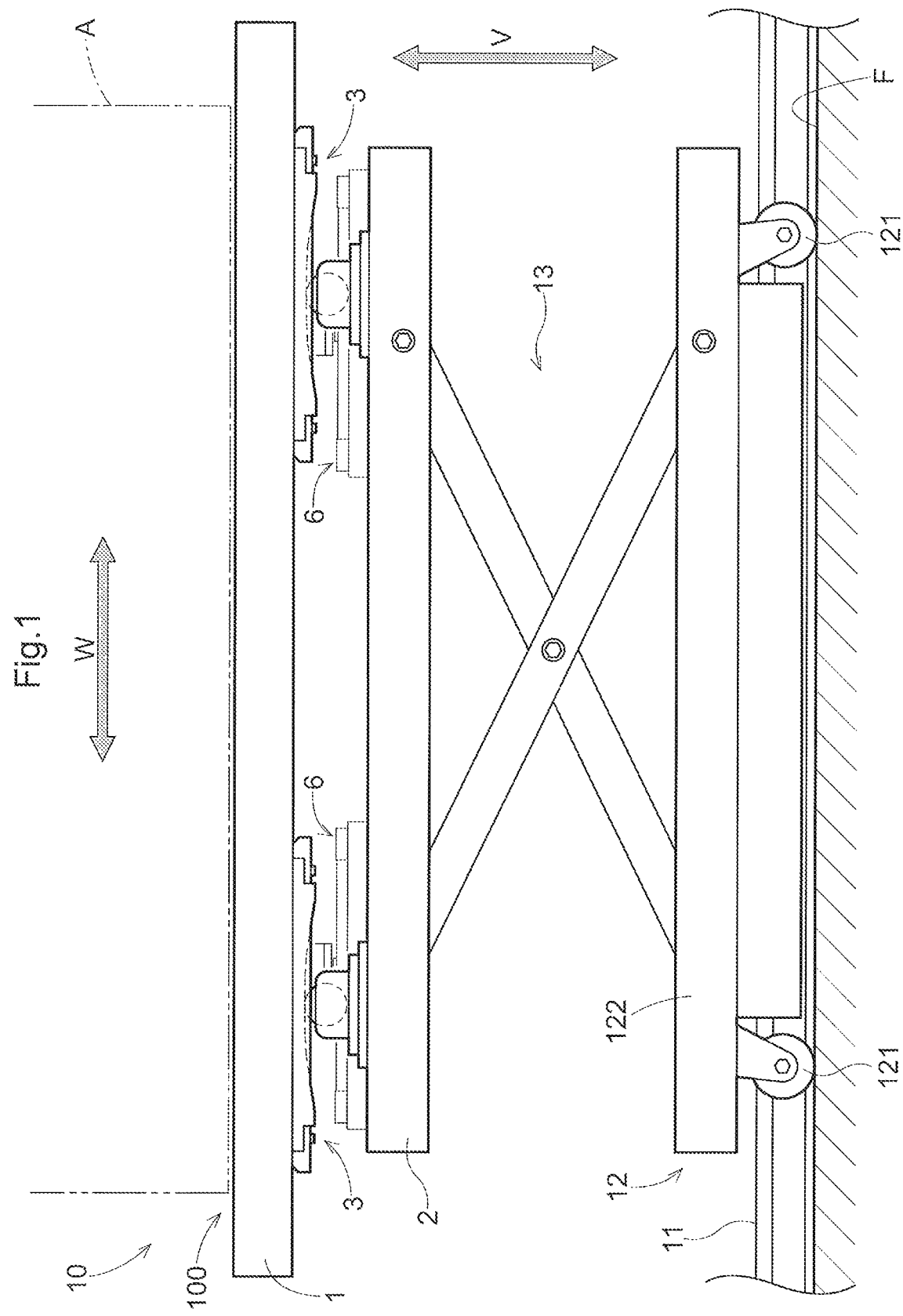
FIG. 1 is a side view illustrating an article transport apparatus including a floating unit according to an embodiment.

The following will describe a floating unit 100 according to an embodiment with reference to the drawings. As shown in FIG. 1, in the present embodiment, the floating unit 100 is provided in an article transport apparatus 10 for transporting an article A.

First, the article transport apparatus 10 will be described. The article transport apparatus 10 includes a rail 11 that extends in the horizontal direction, a travel unit 12 that travels along the rail 11, and an elevating mechanism 13 provided on the travel unit 12.

The rail 11 is laid on a floor surface F. The travel unit 12 includes a plurality of wheels 121 that rolls on the floor surface F, and a supporting pedestal 122 that supports the plurality of wheels 121 so that they can roll. The elevating mechanism 13 is configured to cause the floating unit 100 to move up and down with respect to the supporting pedestal 122. In the present embodiment, the elevating mechanism 13 includes an X-shaped link mechanism and a driving mechanism that changes the distance between the link ends of the link mechanism.

As shown in FIG. 1, the floating unit 100 includes a first member 1, a second member 2, and a plurality of floating mechanisms 3.

Figure 2:
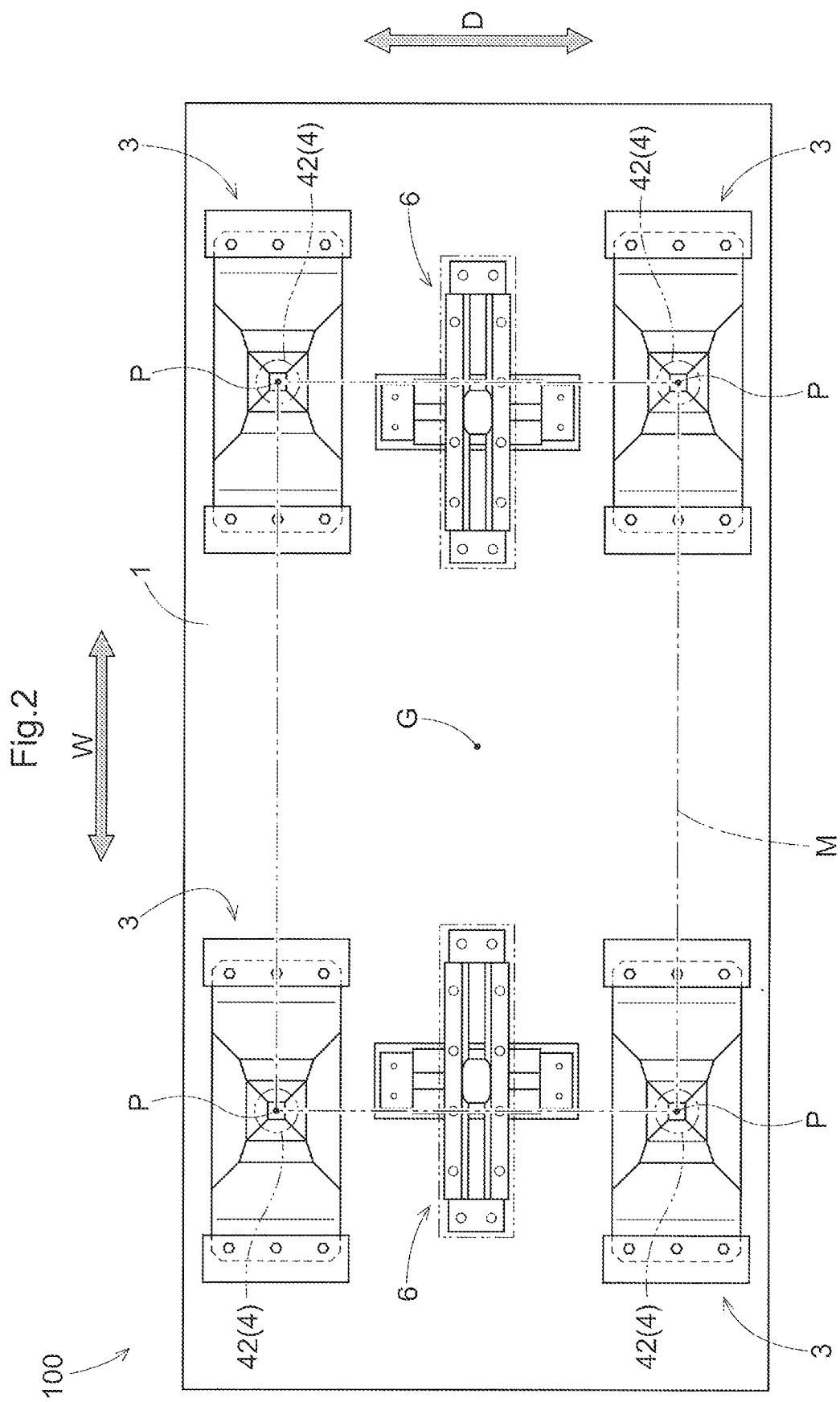
FIG. 2 is a bottom view illustrating the floating unit according to the embodiment with part of the floating unit omitted.

The first member 1 is a member that supports an article A to be transported, from below. As shown in FIGS. 1 and 2, in the present embodiment, the first member 1 is plate-shaped and extends in the horizontal direction. Furthermore, as shown in FIG. 2, in the present embodiment, the first member 1 has a rectangular shape when viewed in a plan view. Here, "rectangular shape" means that the shape of the member as a whole is substantially rectangular even if the shape includes some variations. Hereinafter, the same applies to other expressions using "shape" with respect to geometry and the like.

In the description below, when viewed in a plan view, the direction along the long sides of the first member 1 is defined as "width direction W", and the direction along the short sides of the first member 1 is defined as "depth direction D". Also, the direction orthogonal to the horizontal direction is defined as "vertical direction V". Note that in the present embodiment, the width direction W corresponds to the direction in which the travel unit 12 travels (direction in which the rail 11 extends) (see FIG. 1).

The second member 2 is arranged so as to be opposed to the first member 1 from below. As shown in FIGS. 1 and 2, in the present embodiment, similar to the first member 1, the second member 2 is plate-shaped extending in the horizontal direction. Furthermore, in the present embodiment, the second member 2 has a rectangular shape having long sides extending in the width direction W and short sides extending in the depth direction D, when viewed in a plan view. In the shown example, when viewed in a plan view, the area of the second member 2 is smaller than the area of the first member 1. Also, in a state in which the first member 1 is in a later-described initial position (at which no external force is applied in the horizontal direction), the second member 2 and the first member 1 are arranged so that the centers thereof in the width direction W match each other, and the centers thereof in the depth direction D match each other, when viewed in a plan view.

Each of the plurality of floating mechanisms 3 connects the first member 1 and the second member 2 so that the first member 1 moves relative to the second member 2 in the horizontal direction and the vertical direction V, and the first member 1 rotates relative to the second member 2 around an axis along the vertical direction V.

In the present embodiment, at least three floating mechanisms 3 are provided for one first member 1. Also, the floating mechanisms 3 are provided at the positions that correspond to the vertexes of a polygon M surrounding the gravity center G of the first member 1, when viewed in a vertical direction view along the vertical direction V. In the example shown in FIG. 2, the polygon M is a rectangle that includes long sides extending in the width direction W and short sides extending in the depth direction D, and has the center at the gravity center G of the first member 1. That is to say, four floating mechanisms 3 are provided for one first member 1. Note that the floating mechanisms 3 are arranged so that later-described reference positions P match the vertexes of the polygon M.

Figure 3:
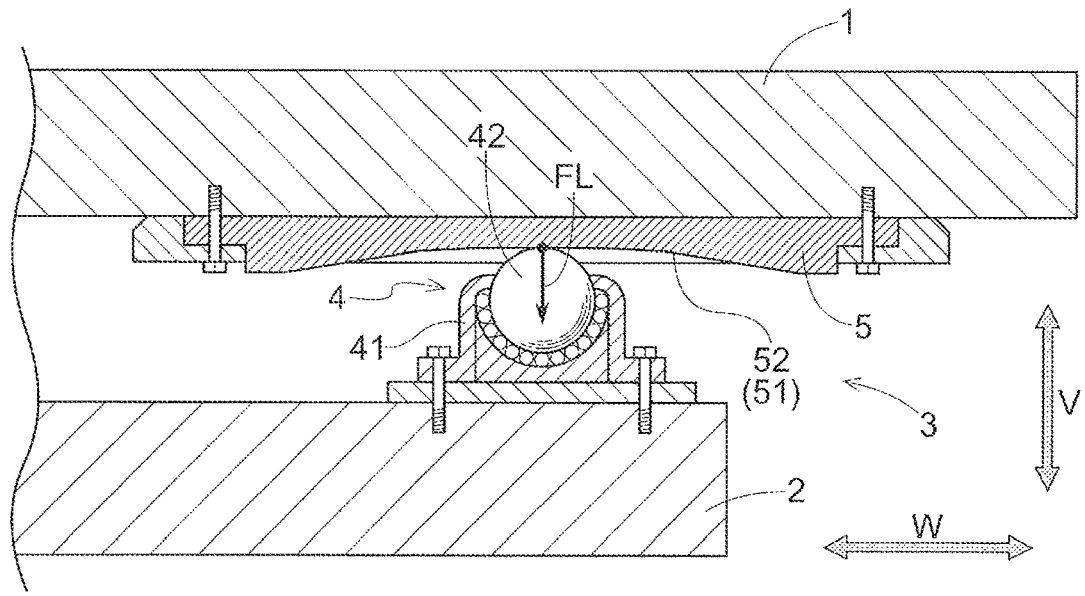
FIG. 3 is a lateral cross-sectional view illustrating a floating mechanism according to the embodiment.

As shown in FIG. 3, each of the plurality of floating mechanisms 3 includes a rolling portion 4 and an opposing portion 5.

The rolling portion 4 includes a holding portion 41 and a sphere 42. The holding portion 41 is fixed to one of the first member 1 and the second member 2. In the present embodiment, the holding portion 41 is fixed to an upper surface of the second member 2. The sphere 42 is held by the holding portion 41 so as to be rotatable in all directions. In the present embodiment, the sphere 42 is held by the holding portion 41 so as to partially protrude upward from the holding portion 41. Note that, for example, a well-known ball caster can be used as the rolling portion 4.

The opposing portion 5 is arranged so as to be opposed to the rolling portion 4 in the vertical direction V. The opposing portion 5 is fixed to the other one of the first member 1 and the second member 2 (the member to which the holding portion 41 of the rolling portion 4 is not fixed). In the present embodiment, the opposing portion 5 is fixed to the lower surface of the first member 1 so as to be opposed to the rolling portion 4 from above.

Figure 4:
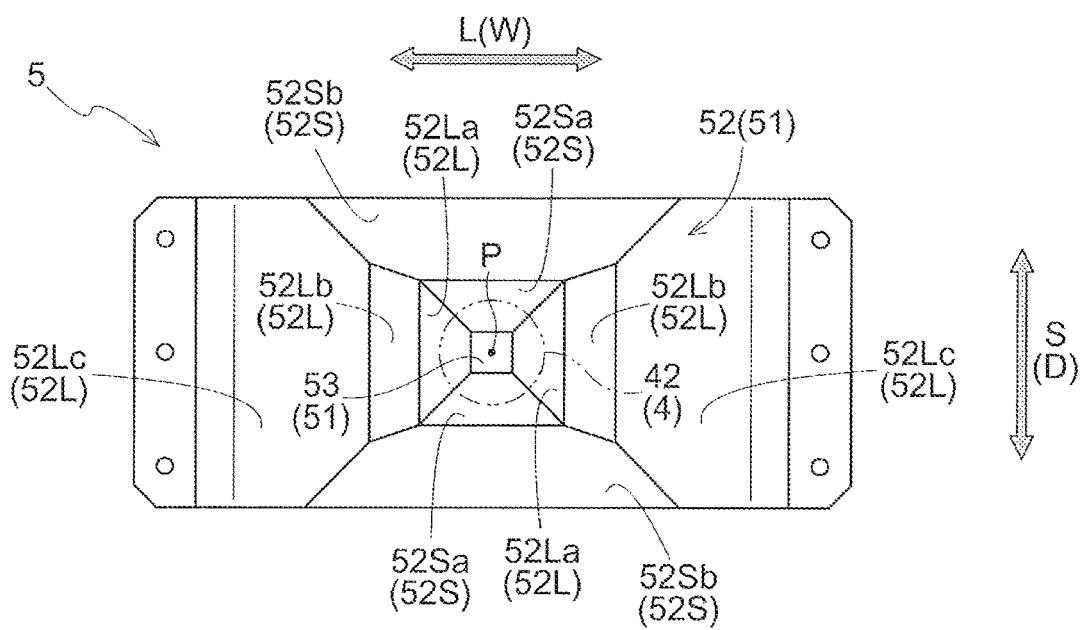
FIG. 4 is a bottom view illustrating an opposing portion according to the embodiment.

The opposing portion 5 has an abutment surface 51 that abuts against the sphere 42 of the rolling portion 4. The abutment surface 51 is a surface on which the sphere 42 rolls. In the present embodiment, the abutment surface 51 is formed on the lower surface of the opposing portion 5. As shown in FIG. 4, in the present embodiment, the abutment surface 51 has a rectangular shape when viewed in a vertical direction view along the vertical direction V.

Figure 5:
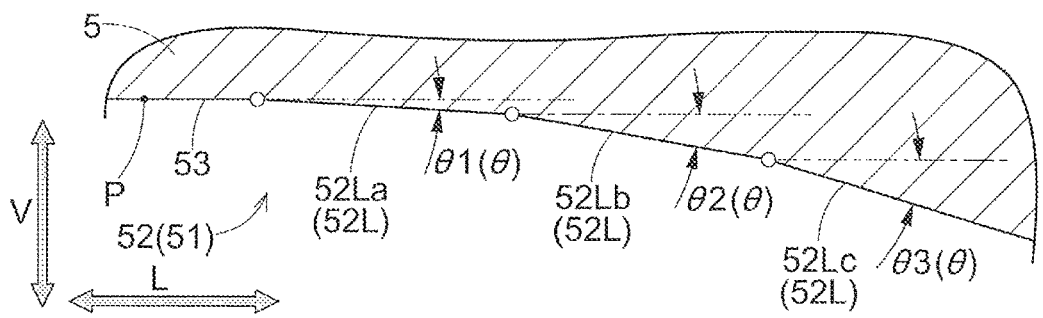
FIG. 5 is a lateral cross-sectional view illustrating an abutment surface of the opposing portion according to the embodiment.

As shown in FIGS. 4 and 5, the abutment surface 51 has an inclined surface 52 that is inclined with respect to the horizontal direction. The inclined surface 52 is formed, over the entire region of the abutment surface 51 in a circumferential direction around the reference position P, so as to come close to the side, in the vertical direction V, on which the sphere 42 is arranged, while extending outward in the horizontal direction from the reference position P. In the present embodiment, the inclined surface 52 is formed, over the entire region of the abutment surface 51 in a circumferential direction around the reference position P, so as to come downward while extending outward in the horizontal direction from the reference position P. In other words, in the present embodiment, the lower side of the floating mechanism 3 in the vertical direction corresponds to a "sphere arrangement side", which is the side in the vertical direction V on which the sphere 42 is arranged.

The reference position P is a position (here, on the upper side in the vertical direction) of the abutment surface 51 that is opposite to and the farthest from the sphere arrangement side, and when the first member 1 is in the initial position, the reference position P is the position that corresponds to the point on the abutment surface 51 that overlaps the center of the sphere 42 when viewed in a vertical direction view along the vertical direction V. In the present embodiment, the reference position P is located at the center (here, the geometric center) of the abutment surface 51 having a rectangular shape when viewed in the vertical direction. The state in which the sphere 42 is located at the position of the abutment surface 51 that corresponds to the reference position P is referred to as a reference state of the floating mechanism 3. Accordingly, the above-described initial position refers to the position of the first member 1 when all of the plurality of floating mechanisms 3 are in the reference state.

As shown in FIG. 4, in the present embodiment, the inclined surface 52 has a rectangular shape when viewed in a vertical direction view along the vertical direction V. In other words, in the present embodiment, the inclined surface 52 has sides having different sizes in two directions that are orthogonal to each other in the horizontal direction. In the following description, of these two directions, the direction in which the inclined surface 52 has the larger sides is referred to as "long direction L", and the direction in which the inclined surface 52 has the smaller sides is referred to as "short direction S". Note that in the present embodiment, the long direction L corresponds to the width direction W, and the short direction S corresponds to the depth direction D.

In the present embodiment, the inclined surface 52 has. In the example shown in FIG. 4, the inclined surface 52 has a shape that corresponds to the side surface of a square frustum having a flat surface 53 in the shape of a square centered at the reference position P. Here, the flat surface 53 is formed as a plane extending in the horizontal direction.

Also, in the present embodiment, the inclined surface 52 includes a plurality of long regions 52L aligned in the long direction L and a plurality of short regions 52S aligned in the short direction S. In the present embodiment, the number of the long regions 52L is larger than the number of the short regions 52S. In the present example, three long regions 52L are arranged on each of the two sides of the flat surface 53 in the long direction L. Also, two short regions 52S are arranged on each of the two sides of the flat surface 53 in the short direction S.

In the description below, of the three long regions 52L, the long region 52L adjacent to the flat surface 53 is defined as "first long region 52La", the long region 52L adjacent to this first long region 52La is defined as "second long region 52Lb", and the long region 52L adjacent to this second long region 52Lb is defined as "third long region 52Lc". Also, of the two short regions 52S, the short region 52S adjacent to the flat surface 53 is defined as "first short region 52Sa", and the short region 52S adjacent to this first short region 52Sa is defined as "second short region 52Sb".

Each of the plurality of long regions 52L is constituted by a plane having a given inclination angle $\theta$. Also, the inclination angles $\theta$ of the plurality of long regions 52L are different from each other. Similarly, each of the plurality of short regions 52S is constituted by a plane having a given inclination angle $\theta$. Also, the inclination angles $\theta$ of the plurality of short regions 52S are different from each other. Here, an inclination angle $\theta$ refers to an angle at which the inclined surface 52 is inclined with respect to the horizontal direction to the side, in the vertical direction V, on which the sphere 42 is arranged (in the present embodiment, the lower side of the floating mechanism 3 in the vertical direction).

In the example shown in FIG. 5, the inclination angle $\theta$ of the second long region 52Lb is larger than the inclination angle $\theta$ of the first long region 52La. Also, the inclination angle $\theta$ of the third long region 52Lc is larger than the inclination angle $\theta$ of the second long region 52Lb. In other words, letting the inclination angle $\theta$ of the first long region 52La be "first inclination angle $\theta1$", the inclination angle $\theta$ of the second long region 52Lb be "second inclination angle $\theta2$", and the inclination angle $\theta$ of the third long region 52Lc be "third inclination angle $\theta3$", the relationship $\theta1<\theta2<\theta3$ is satisfied.

Also, in the present example, the inclination angle $\theta$ of the second short region 52Sb is larger than the inclination angle $\theta$ of the first short region 52Sa. Here, the inclination angle $\theta$ of the first short region 52Sa is set to be equal to the inclination angle $\theta$ (first inclination angle $\theta1$) of the first long region 52La, and the inclination angle $\theta$ of the second short region 52Sb is set to be equal to the inclination angle $\theta$ (third inclination angle $\theta3$) of the third long region 52Lc.

In this manner, in the present example, the inclined surface 52 is formed so that the inclination angle $\theta$ increases while extending outward in the horizontal direction from the reference position P.

Figure 6:
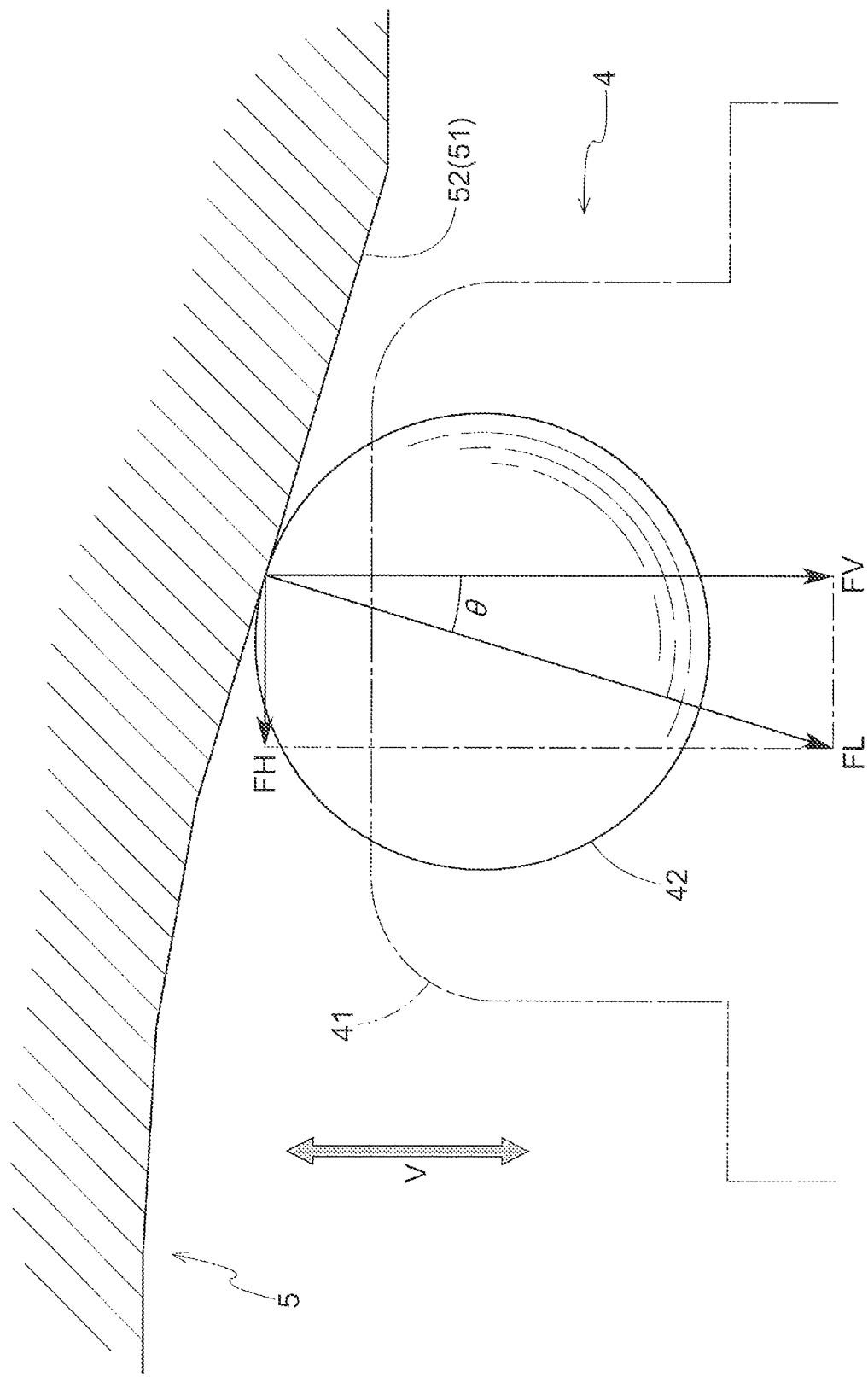
FIG. 6 is an enlarged view illustrating a portion in which a sphere and an inclined surface of the floating mechanism are opposed to each other according to the embodiment.

In each of the plurality of floating mechanisms 3, the rolling portion 4 and the opposing portion 5 are arranged so that a load FL having a component in the vertical direction V acts on a position at which the abutment surface 51 abuts against the sphere 42. In the present embodiment, as shown in FIG. 3, the abutment surface 51 and the sphere 42 are arranged so as to be opposed to each other in the vertical direction V. Accordingly, the load FL in the vertical direction V acts on the position at which the abutment surface 51 abuts against the sphere 42. Also, as shown in FIG. 6, in a state in which the sphere 42 is opposed to the inclined surface 52, a load FL in a direction inclined with respect to the vertical direction V acts on the sphere 42 depending on the inclination angle θ of the inclined surface 52.

Upon application of an external force in the horizontal direction to the first member 1 in the initial position, the sphere 42 rolls on the inclined surface 52 away from the reference position P, and is opposed to the inclined surface 52. In this state, a vertical load FV, which corresponds to a force component of the load FL in the vertical direction V, and a horizontal load FH, which corresponds to a force component of the load FL in the horizontal direction, can be regarded as acting on the sphere 42. Also, the vertical load FV is supported by the holding portion 41, but the horizontal load FH acts as a force in a direction in which the sphere 42 is returned to the reference position P along the inclined surface 52. At this time, the magnitude of the horizontal load FH depends on the inclination angle θ of the inclined surface 52. Accordingly, in the state in which the sphere 42 is opposed to the inclined surface 52, the sphere 42 rolls toward the reference position P along the inclined surface 52 upon application of the horizontal load FH having a magnitude that corresponds to the inclination angle θ of the inclined surface 52.

Thus, the floating mechanisms 3 generate a restoring force in a direction in which the first member 1 is returned to the initial position. In other words, the floating unit 100 obtains the restoring force for returning the first member 1 to the initial position by the spheres 42 of the plurality of floating mechanisms 3 rolling on the respective inclined surfaces 52. Such a configuration is advantageous in that, the restoring force can be increased with an increase in the component of the load FL in the vertical direction V that acts on the position at which the abutment surface 51 abuts against the sphere 42, as a result of an article A being placed on the first member 1, for example.

As shown in FIG. 2, in the present embodiment, the floating unit 100 further includes guide mechanisms 6 that guide the relative movement of the first member 1 with respect to the second member 2. In the example shown in FIG. 2, one guide mechanism 6 is provided between two floating mechanisms 3 aligned in the depth direction D on each of the sides of the gravity center G of the first member 1 in the width direction W. In other words, one first member 1 is provided with two guide mechanisms 6.

Figure 7:
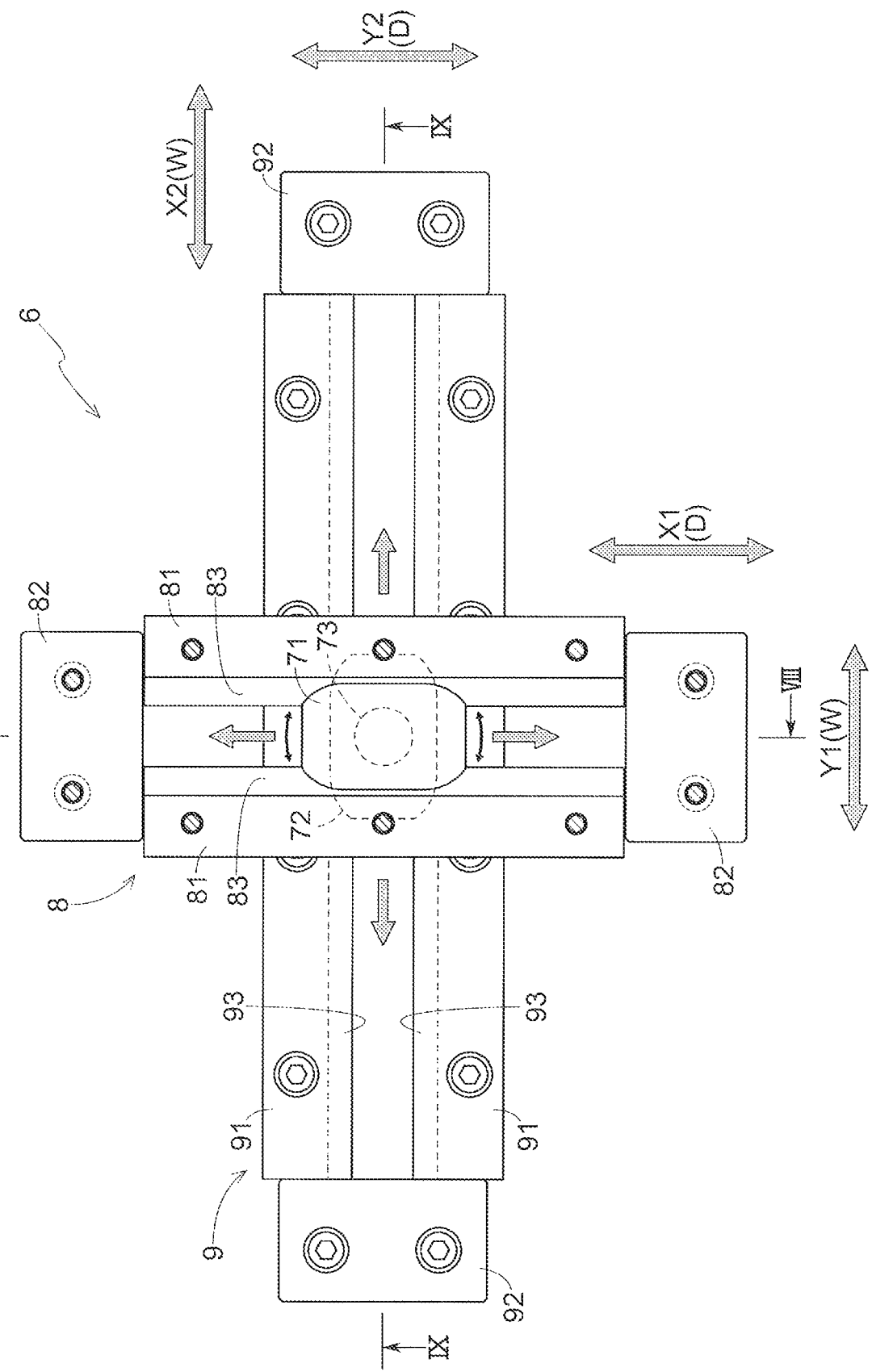
FIG. 7 is a plan view illustrating a guide mechanism according to the embodiment.

As shown in FIG. 7, in the present embodiment, each guide mechanism 6 includes a first key 71, a second key 72, a first key guide 8, and a second key guide 9.

In the following description, a specific direction that is oriented along the horizontal direction is defined as "first direction X1", and a direction that is oriented along the horizontal direction and is orthogonal to the first direction X1 is defined as "first orthogonal direction Y1". Also, a direction that is oriented along the horizontal direction and intersects with the first direction X1 is defined as "second direction X2", and a direction that is oriented along the horizontal direction and is orthogonal to the second direction X2 is defined as "second orthogonal direction Y2". Note that in the present embodiment, when the first member 1 is in the initial position, the first direction X1 and the second direction X2 are orthogonal to each other. In other words, when the first member 1 is in the initial position, the first direction X1 matches the second orthogonal direction Y2, and the second direction X2 matches the first orthogonal direction Y1. Also, in the present embodiment, the first direction X1 and the second orthogonal direction Y2 match the depth direction D, and the second direction X2 and the first orthogonal direction Y1 match the width direction W (see FIG. 2).

Figure 8:
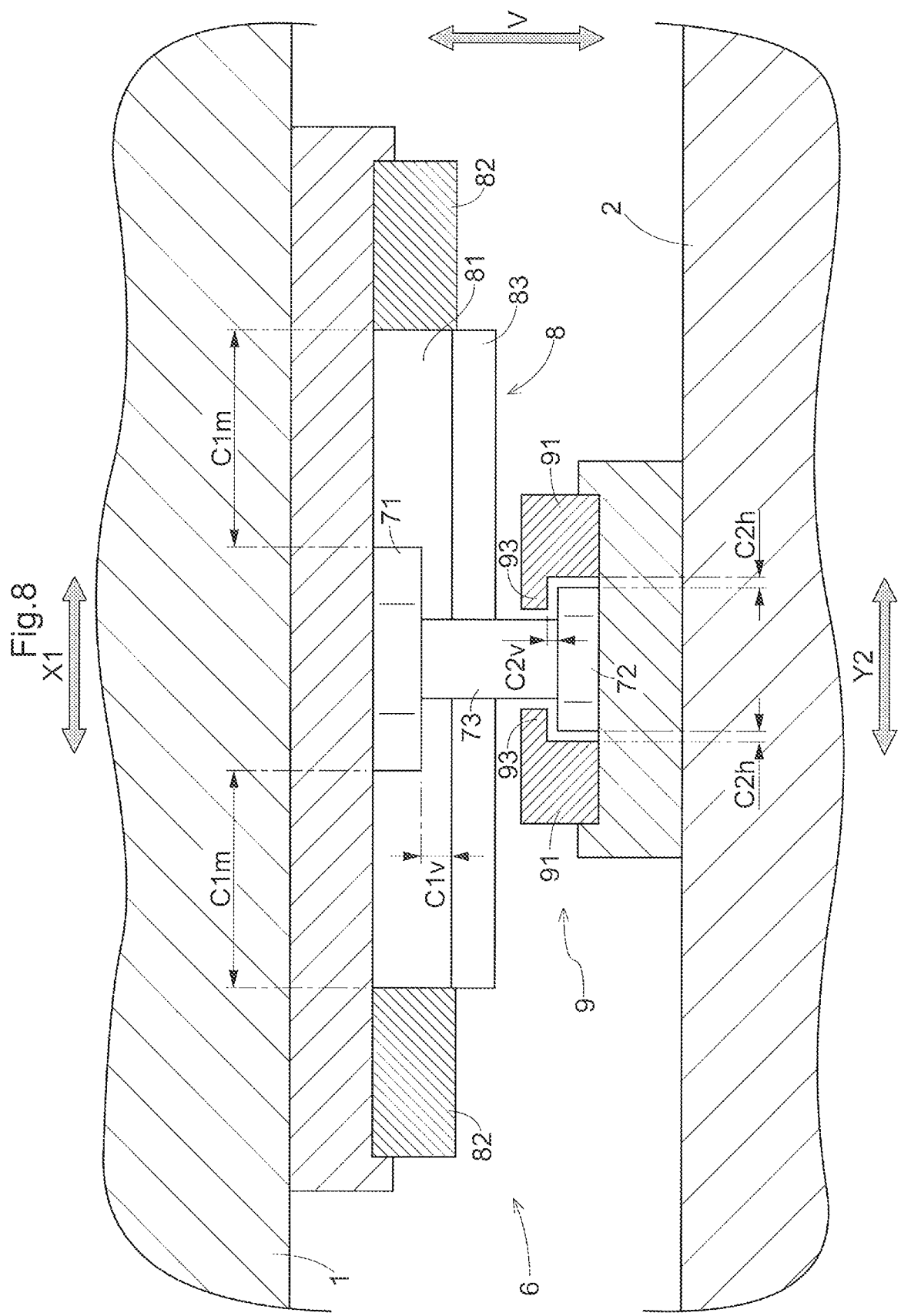
FIG. 8 is a cross-sectional view taken along a line VIII-VIII in FIG. 7.
Figure 9:
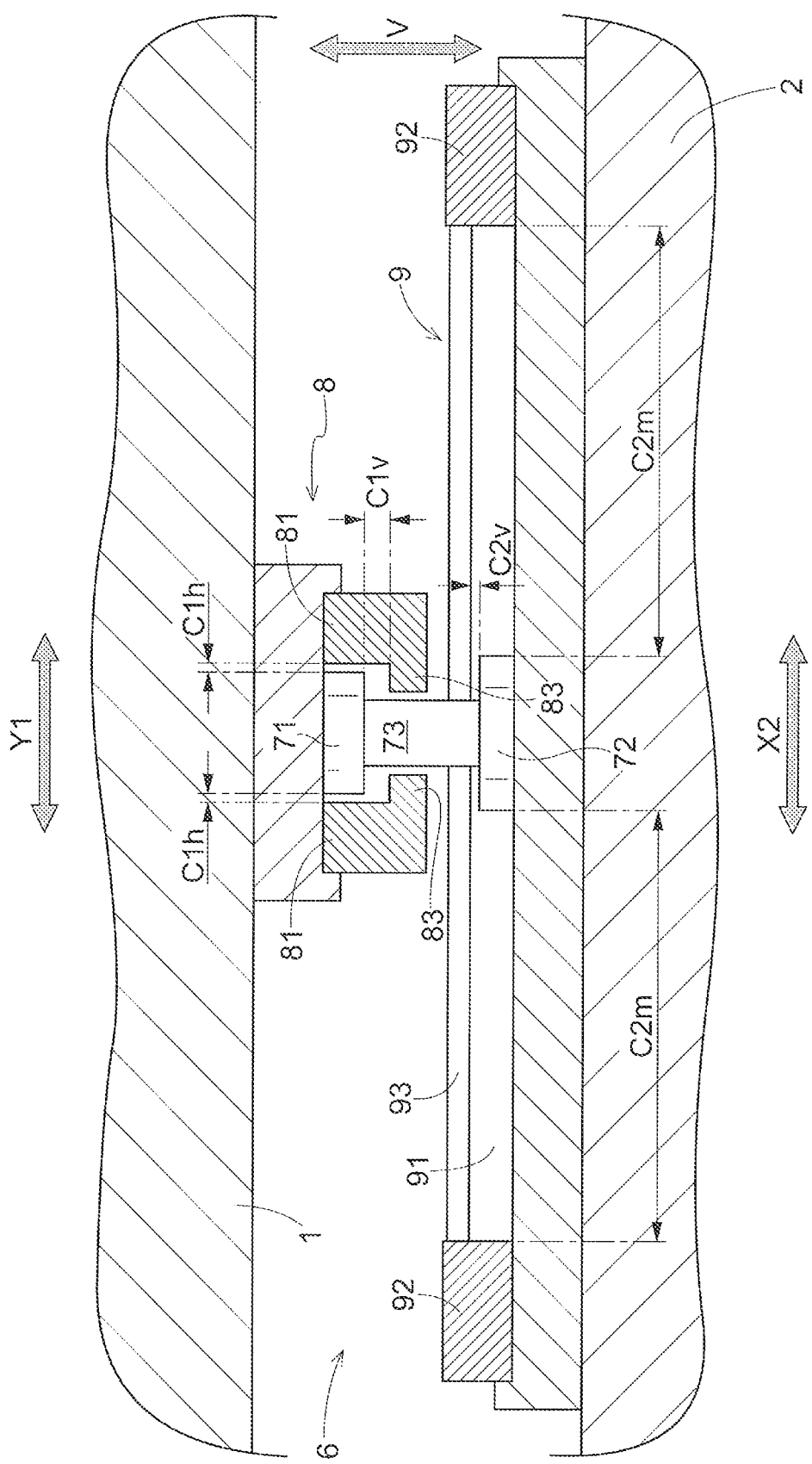
FIG. 9 is a cross-sectional view taken along a line IX-IX in FIG. 7.

As shown in FIGS. 8 and 9, the first key 71 and the second key 72 are aligned in the vertical direction V. In the present embodiment, the first key 71 is arranged above the second key 72. The first key 71 and the second key 72 are coupled to each other. In the present embodiment, the first key 71 and the second key 72 are coupled to each other via a rod-shaped coupling member 73 that extends in the vertical direction V. Also, in the present embodiment, the first key 71 and the second key 72 are plate-shaped extending in the horizontal direction.

As shown in FIG. 7, in the present embodiment, the first key 71 has the shape of a rounded corner rectangle that has long sides extending in the first direction X1 and short sides extending in the first orthogonal direction Y1, when viewed in a vertical direction view along the vertical direction V. Also, the second key 72 has the shape of a rounded corner rectangle that has long sides extending in the second direction X2 and short sides extending in the second orthogonal direction Y2, when viewed in a vertical direction view along the vertical direction V. Also, the first key 71 and the second key 72 are arranged so that their centers overlap each other when viewed in a vertical direction view along the vertical direction V. Here, the "shape of a rounded corner rectangle" refers to a shape obtained by chamfering the four corners of a rectangle in an arc shape.

The first key guide 8 is fixed to one of the first member 1 and the second member 2. Also, the second key guide 9 is fixed to the other one of the first member 1 and the second member 2 (to which the first key guide 8 is not fixed). As shown in FIGS. 8 and 9, in the present embodiment, the first key guide 8 is fixed to the lower surface of the first member 1. Also, the second key guide 9 is fixed to the upper surface of the second member 2. Note that the first key 71 and the second key 72 are not fixed to the first member 1 or the second member 2.

As shown in FIG. 7, the first key guide 8 includes a pair of first horizontal guide portions 81, a pair of first horizontal confinement portions 82, and at least one first vertical confinement portion 83.

The pair of first horizontal guide portions 81 are formed extending in the first direction X1. The pair of first horizontal guide portions 81 are arranged on the two sides of the first key 71 in the first orthogonal direction Y1. Also, as shown in FIGS. 8 and 9, the pair of first horizontal guide portions 81 are arranged at positions at which the first horizontal guide portions 81 overlap the first key 71 when viewed in a first orthogonal direction view along the first orthogonal direction Y1. Here, "overlapping when viewed in a specific directional view" with respect to the arrangement of two elements means that when a virtual straight line parallel to this viewing direction is moved in directions orthogonal to the virtual straight line, a region in which the virtual straight line intersects with both of the two elements exists at least partially.

As shown in FIG. 7, the pair of first horizontal confinement portions 82 are arranged on the two sides of the first key 71 in the first direction X1. Also, as shown in FIG. 8, the pair of first horizontal confinement portions 82 are arranged at positions at which the first horizontal confinement portions 82 overlap the first key 71 when viewed in a first direction view along the first direction X1.

The first vertical confinement portion 83 is arranged on the side of the first key 71 facing toward the second key 72 in the vertical direction V. In the present embodiment, the first vertical confinement portion 83 is arranged below the first key 71. As shown in FIG. 7, the first vertical confinement portion 83 is arranged at a position at which the first vertical confinement portion 83 overlaps the first key 71 when viewed in a vertical direction view along the vertical direction V. In the present embodiment, a pair of first vertical confinement portions 83 are arranged so as to be separate from each other in the first orthogonal direction Y1, and are formed extending in the first direction X1. Also, the pair of first vertical confinement portions 83 are formed protruding to the side on which they approach each other from the surfaces of the pair of first horizontal guide portions 81 that are opposed to the first key 71 in the first orthogonal direction Y1.

As shown in FIG. 8, a first movement clearance C1$m$ is formed between each of the pair of first horizontal confinement portions 82 and the first key 71 in the first direction X1. Also, as shown in FIG. 9, a first horizontal clearance C1$h$ is formed between each of the pair of first horizontal guide portions 81 and the first key 71 in the first orthogonal direction Y1. Note that in the present embodiment, the surfaces (inner surfaces) of the pair of first horizontal guide portions 81 that are opposed to the first key 71 in the first orthogonal direction Y1 are formed as planes extending in the first direction X1 (see FIG. 7).

Also, as shown in FIGS. 8 and 9, a first vertical clearance C1$v$ is formed between the first vertical confinement portion 83 and the first key 71 in the vertical direction V. The first vertical clearance C1$v$ is a clearance that is formed when the first member 1 is in the initial position. In the shown example, when the first member 1 is in the initial position, the first key 71 is located at the farthermost position from the first vertical confinement portions 83. Note that in the present embodiment, the surfaces of the pair of first vertical confinement portions 83 and the first key 71 that are opposed to each other in the vertical direction V are formed as planes extending in the horizontal direction.

As shown in FIG. 7, the second key guide 9 includes a pair of second horizontal guide portions 91, a pair of second horizontal confinement portions 92, and at least one second vertical confinement portion 93.

The pair of second horizontal guide portions 91 are formed extending in the second direction X2. The pair of second horizontal guide portions 91 are arranged on the two sides of the second key 72 in the second orthogonal direction Y2. Also, as shown in FIGS. 8 and 9, the pair of second horizontal guide portions 91 are arranged at positions at which the second horizontal guide portions 91 overlap the second key 72 when viewed in a second orthogonal direction view along the second orthogonal direction Y2.

As shown in FIG. 7, the pair of second horizontal confinement portions 92 are arranged on the two sides of the second key 72 in the second direction X2. Also, as shown in FIG. 9, the pair of second horizontal confinement portions 92 are arranged at positions at which the second horizontal confinement portions 92 overlap the second key 72 when viewed in a second direction view along the second direction X2.

The second vertical confinement portion 93 is arranged on the side of the second key 72 facing toward the first key 71 in the vertical direction V. In the present embodiment, the second vertical confinement portion 93 is arranged above the second key 72. As shown in FIG. 7, the second vertical confinement portion 93 is arranged at a position at which the second vertical confinement portion 93 overlaps the second key 72 when viewed in a vertical direction view along the vertical direction V. In the present embodiment, a pair of second vertical confinement portions 93 are arranged so as to be separate from each other in the second orthogonal direction Y2, and are formed extending in the second direction X2. Also, the pair of second vertical confinement portions 93 are formed protruding to the side on which they approach each other from the surfaces of the pair of second horizontal guide portions 91 that are opposed to the second key 72 in the second orthogonal direction Y2.

As shown in FIG. 9, a second movement clearance C2$m$ is formed between each of the pair of second horizontal confinement portions 92 and the second key 72 in the second direction X2. Also, as shown in FIG. 8, a second horizontal clearance C2$h$ is formed between each of the pair of second horizontal guide portions 91 and the second key 72 in the second orthogonal direction Y2. Note that in the present embodiment, the surfaces (inner surfaces) of the pair of second horizontal guide portions 91 that are opposed to the second key 72 in the second orthogonal direction Y2 are formed as planes extending in the second direction X2 (see FIG. 7).

Also, as shown in FIGS. 8 and 9, a second vertical clearance C2$v$ is formed between the second vertical confinement portion 93 and the second key 72 in the vertical direction V. The second vertical clearance C2$v$ is a clearance that is formed when the first member 1 is in the initial position. In the shown example, when the first member 1 is in the initial position, the second key 72 is located at the farthermost position from the second vertical confinement portion 93. Note that in the present embodiment, the surfaces of the pair of second vertical confinement portions 93 and the second key 72 that are opposed to each other in the vertical direction V are formed as planes extending in the horizontal direction.

The following will describe an operation aspect of the guide mechanism 6 according to the present embodiment.

Figure 10:
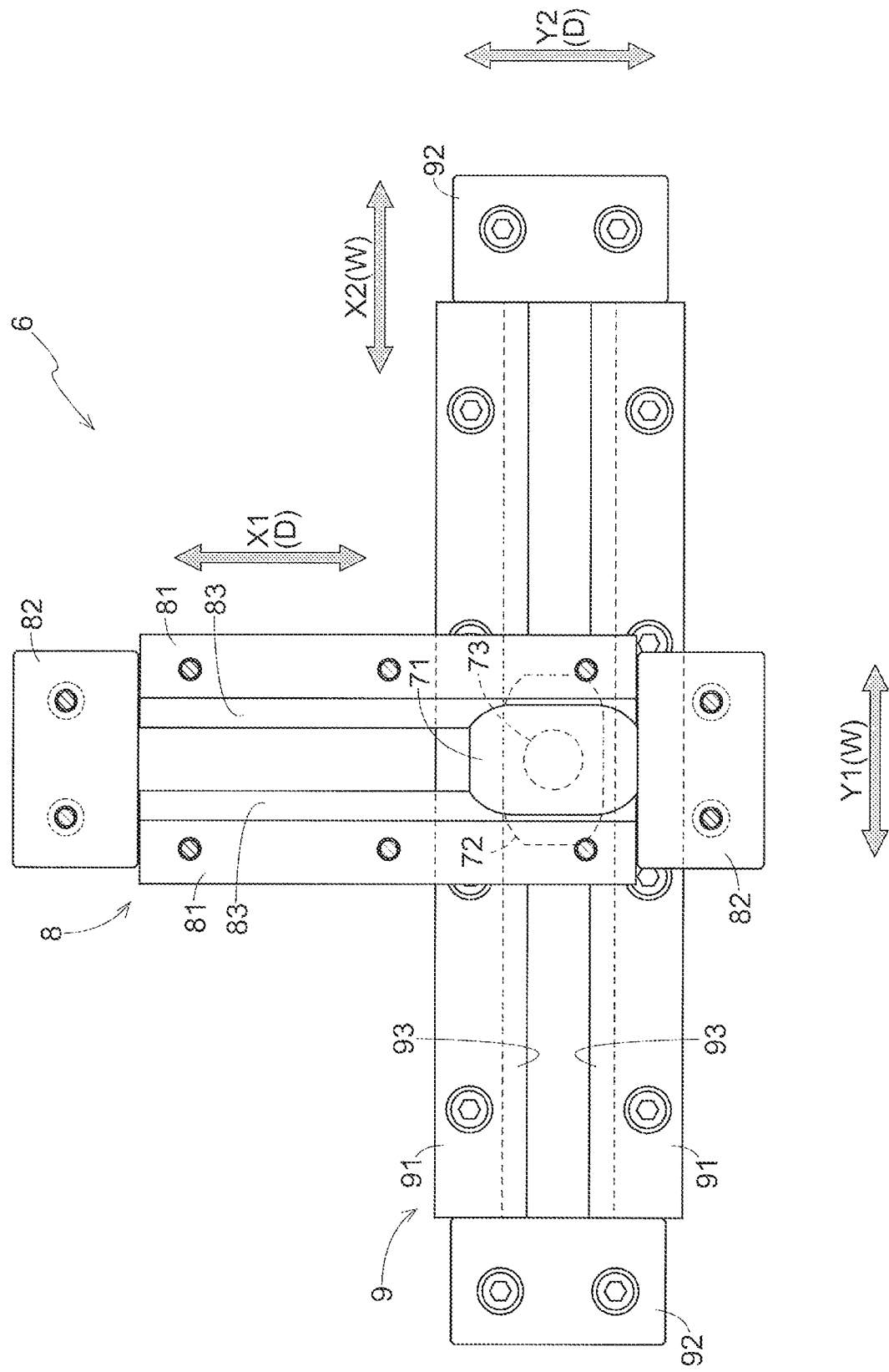
FIG. 10 is a diagram illustrating an example of an operation aspect of the guide mechanism.

As shown in FIG. 10, if an external force is applied to the first member 1 toward one side (upper side in FIG. 10) in the depth direction D, the first key guide 8 fixed to the first member 1 is moved to the one side in the depth direction D. Also, of the pair of first horizontal confinement portions 82 of the first key guide 8, the first horizontal confinement portion 82 located on the other side (lower side in FIG. 10) in the depth direction D abuts against the first key 71. When the first key guide 8 is further moved to the one side (upper side in FIG. 10) in the depth direction D, the first key 71 is also moved together with the first key guide 8 to the one side in the depth direction D, and the second key 72 coupled to the first key 71 abuts against, of the pair of second horizontal guide portions 91 of the second key guide 9, the second horizontal guide portion 91 located on the one side (upper side in FIG. 10) in the depth direction D. Accordingly, the first key guide 8 is prevented from further moving to the one side (upper side in FIG. 10) in the depth direction D.

In this way, when the first horizontal confinement portion 82 located on the other side (lower side in FIG. 10) in the depth direction D abuts against the first key 71, and the second key 72 abuts against the second horizontal guide portion 91 located on the one side (upper side in FIG. 10) in the depth direction D, a state is realized in which the first key guide 8 is located at the farthermost position on the one side (upper side in FIG. 10) in the depth direction D. On the other hand, although a specific description is omitted, when the first horizontal confinement portion 82 located on the one side (upper side in FIG. 10) in the depth direction D abuts against the first key 71, and the second key 72 abuts against the second horizontal guide portion 91 located on the other side (lower side in FIG. 10) in the depth direction D, a state is realized in which the first key guide 8 is located at the farthermost position on the other side (lower side in FIG. 10) in the depth direction D.

Figure 11:
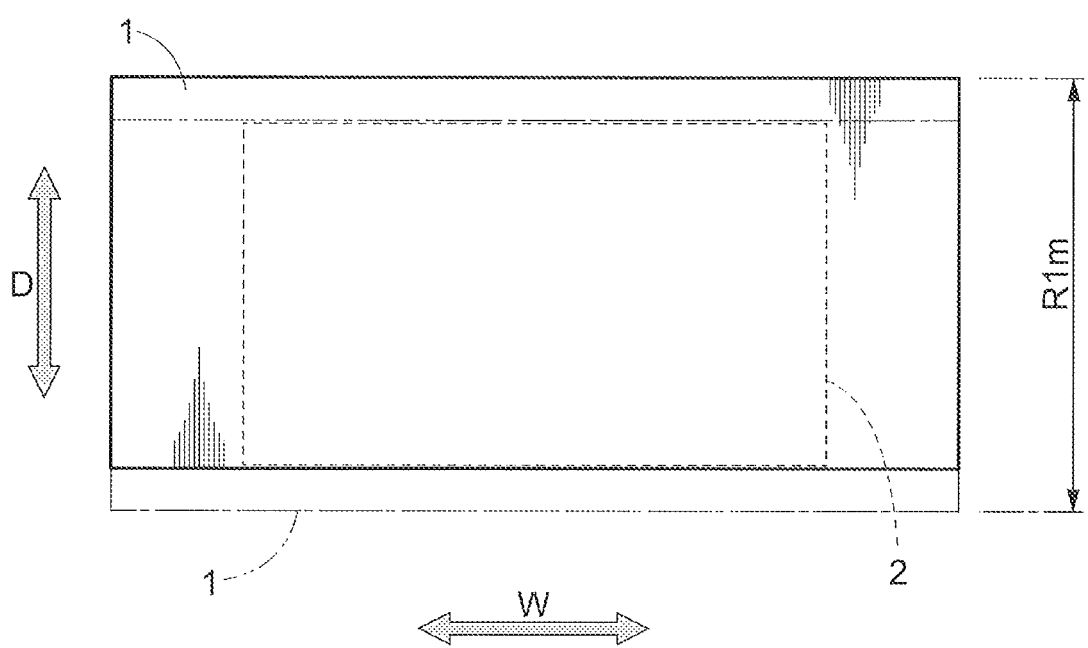
FIG. 11 is a diagram illustrating a first movement range of a first member according to the embodiment.

Accordingly, as shown in FIG. 11, the first member 1 is movable in the depth direction D within a predetermined first movement range R1$m$ extending in the depth direction D. That is to say, the guide mechanisms 6 are configured to limit the relative movement of the first member 1 with respect to the second member 2 in the first direction X1 within the predetermined first movement range R1$m$ extending in the first direction X1. Note that the first movement range R1$m$ is a range that corresponds to the first movement clearance C1$m$ (see FIG. 8) formed between each of the pair of first horizontal confinement portions 82 and the first key 71 in the first direction X1. Accordingly, the first movement clearance C1$m$ is set based on the first movement range Rim.

Figure 12:
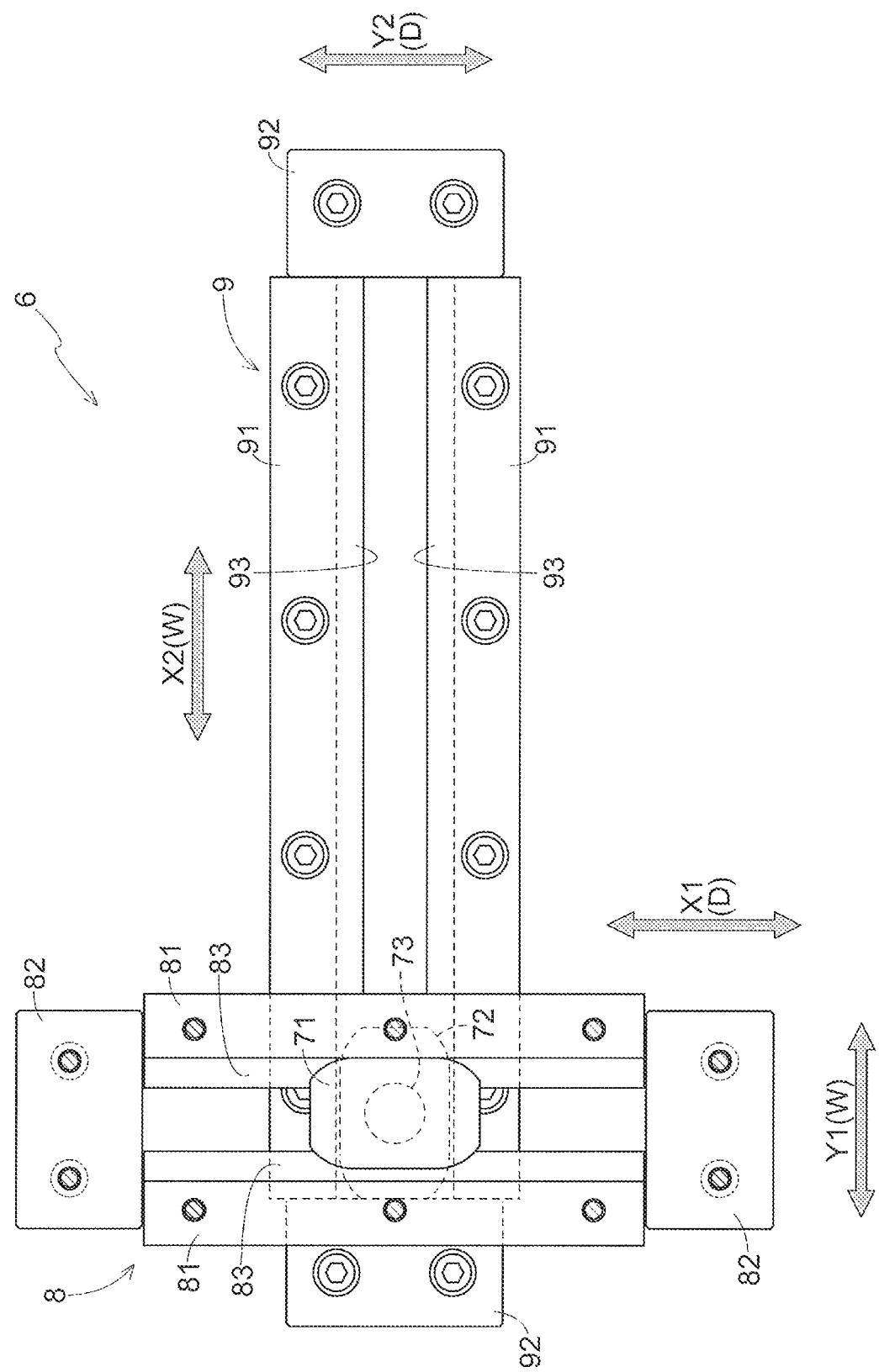
FIG. 12 is a diagram illustrating an example of the operation aspect of the guide mechanism

As shown in FIG. 12, if an external force is applied to the first member 1 toward one side (left side in FIG. 12) in the width direction W, the first key guide 8 fixed to the first member 1 is moved to the one side in the width direction W, and of the pair of first horizontal guide portions 81 of the first key guide 8, the first horizontal guide portion 81 located on the other side (right side in FIG. 12) in the width direction W abuts against the first key 71. Also, the first key guide 8 is also moved together with the first key 71 to the one side (left side in FIG. 12) in the width direction W. At this time, the second key 72 coupled to the first key 71 is moved to the one side (left side in FIG. 12) in the width direction W while being guided by the pair of second horizontal guide portions 91 of the second key guide 9, and thus the first key guide 8 can be appropriately moved to the one side in the width direction W. Thereafter, the first key guide 8 is moved to the one side in the width direction W until the second key 72 abuts against, of the pair of second horizontal confinement portions 92 of the second key guide 9, the second horizontal confinement portion 92 located on the one side (left side in FIG. 12) in the width direction W.

In this way, when the first horizontal guide portion 81 located on the other side (right side in FIG. 12) in the width direction W abuts against the first key 71, and the second key 72 abuts against the second horizontal confinement portion 92 located on the one side (left side in FIG. 12) in the width direction W, a state is realized in which the first key guide 8 is located at the farthermost position on the one side (left side in FIG. 12) in the width direction W. On the other hand, although a specific description is omitted, when the first horizontal guide portion 81 located on the one side (left side in FIG. 12) in the width direction W abuts against the first key 71, and the second key 72 abuts against the second horizontal confinement portion 92 located on the other side (right side in FIG. 12) in the width direction W, a state is realized in which the first key guide 8 is located at the farthermost position on the other side (right side in FIG. 12) in the width direction W.

Figure 13:
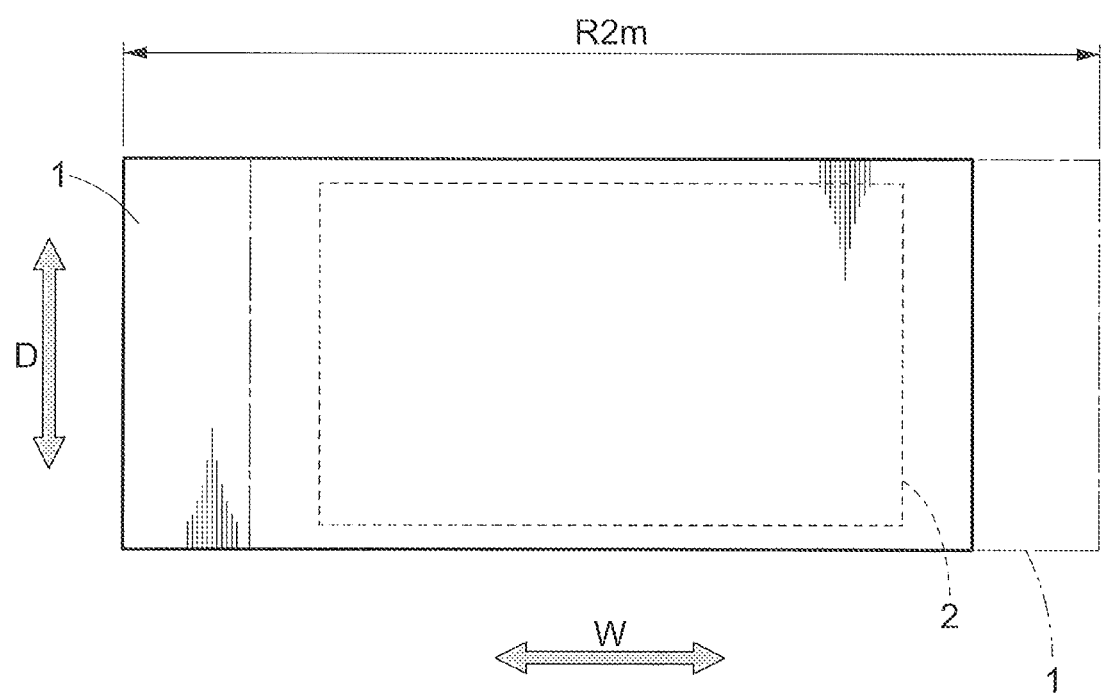
FIG. 13 is a diagram illustrating a second movement range of the first member according to the embodiment.

Accordingly, as shown in FIG. 13, the first member 1 is movable in the width direction W within a predetermined second movement range R2$m$ extending in the width direction W. That is to say, the guide mechanisms 6 are configured to limit the relative movement of the first member 1 with respect to the second member 2 in the second direction X2 within the predetermined second movement range R2$m$ extending in the second direction X2. Note that the second movement range R2$m$ is a range that corresponds to the second movement clearance C2$m$ (see FIG. 9) formed between each of the pair of second horizontal confinement portions 92 and the second key 72 in the second direction X2. Accordingly, the second movement clearance C2$m$ is set based on the second movement range R2$m$.

Figure 14:
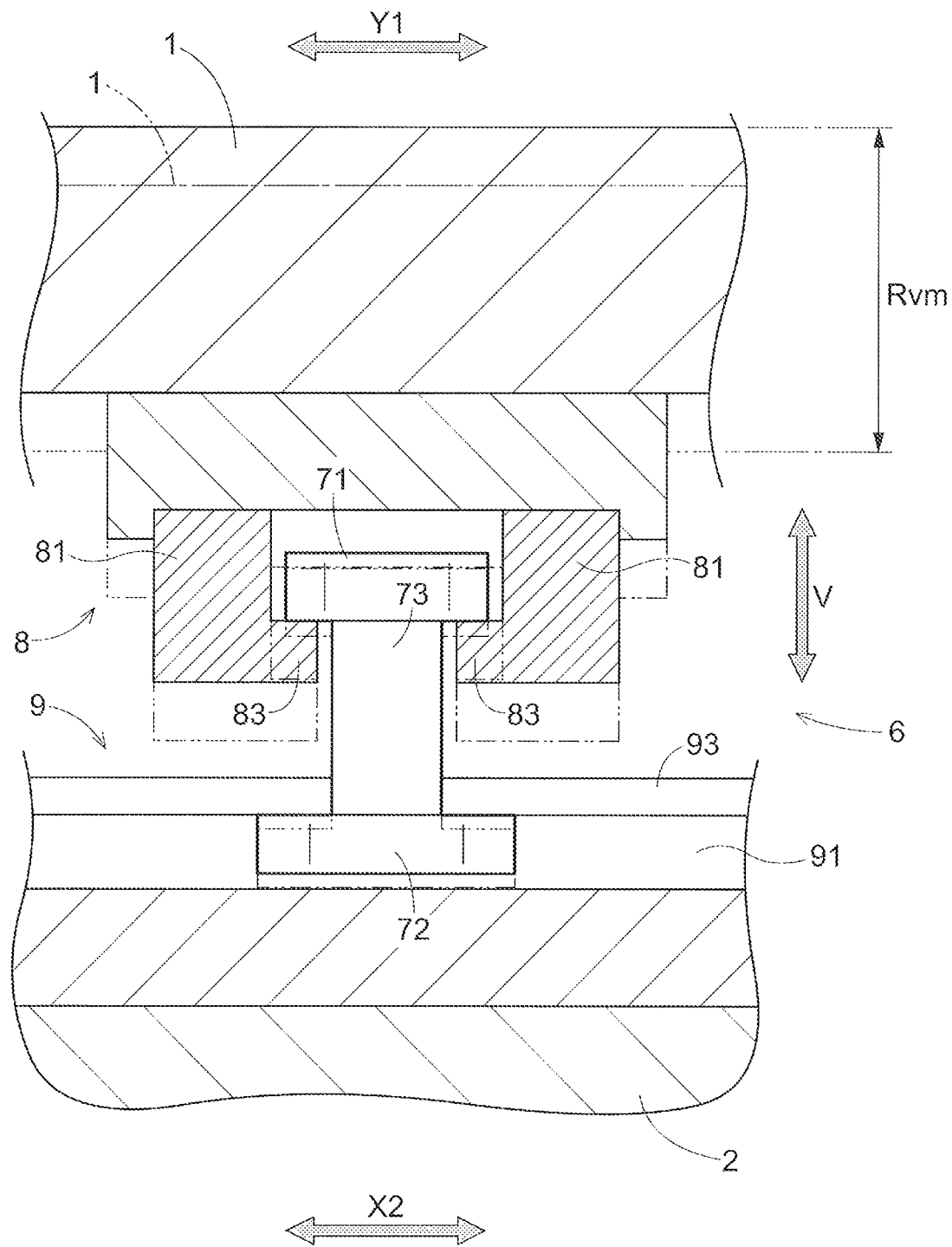
FIG. 14 is a diagram illustrating a vertical movement range of the first member according to the embodiment.

If, upon application of an external force in the horizontal direction to the first member 1, the sphere 42 rolls on the inclined surface 52 away from the reference position P (see FIGS. 3 and 4), the first member 1 is moved upward relative to the second member 2 as shown in FIG. 14. At this time, the first key guide 8 fixed to the first member 1 is moved upward, and the pair of first vertical confinement portions 83 of the first key guide 8 abut against the first key 71. When the first key guide 8 is further moved upward, the first key 71 is raised by the pair of first vertical confinement portions 83, and correspondingly, the second key 72 coupled to the first key 71 is also moved upward. Also, the first key guide 8 is moved upward until the second key 72 abuts against the pair of second vertical confinement portions 93 of the second key guide 9.

In this way, when the pair of first vertical confinement portions 83 abut against the first key 71, and the second key 72 abuts against the pair of second vertical confinement portions 93, a state is realized in which the first key guide 8 is located at the uppermost position.

Accordingly, the first member 1 is movable in the vertical direction V within a predetermined vertical movement range Rvm extending in the vertical direction V. That is to say, the guide mechanisms 6 are configured to limit the relative movement of the first member 1 with respect to the second member 2 in the vertical direction V within the predetermined vertical movement range Rvm extending in the vertical direction V. Note that the vertical movement range Rvm is a range that corresponds to the first vertical clearance C1$v$ (see FIGS. 8 and 9) in the vertical direction V formed between the first vertical confinement portions 83 and the first key 71, and to the second vertical clearance C2$v$ (see FIGS. 8 and 9) in the vertical direction V formed between the second vertical confinement portions 93 and the second key 72. Accordingly, the sum of the first vertical clearance C1$v$ and the second vertical clearance C2$v$ is set based on the vertical movement range Rvm.

Figure 15:
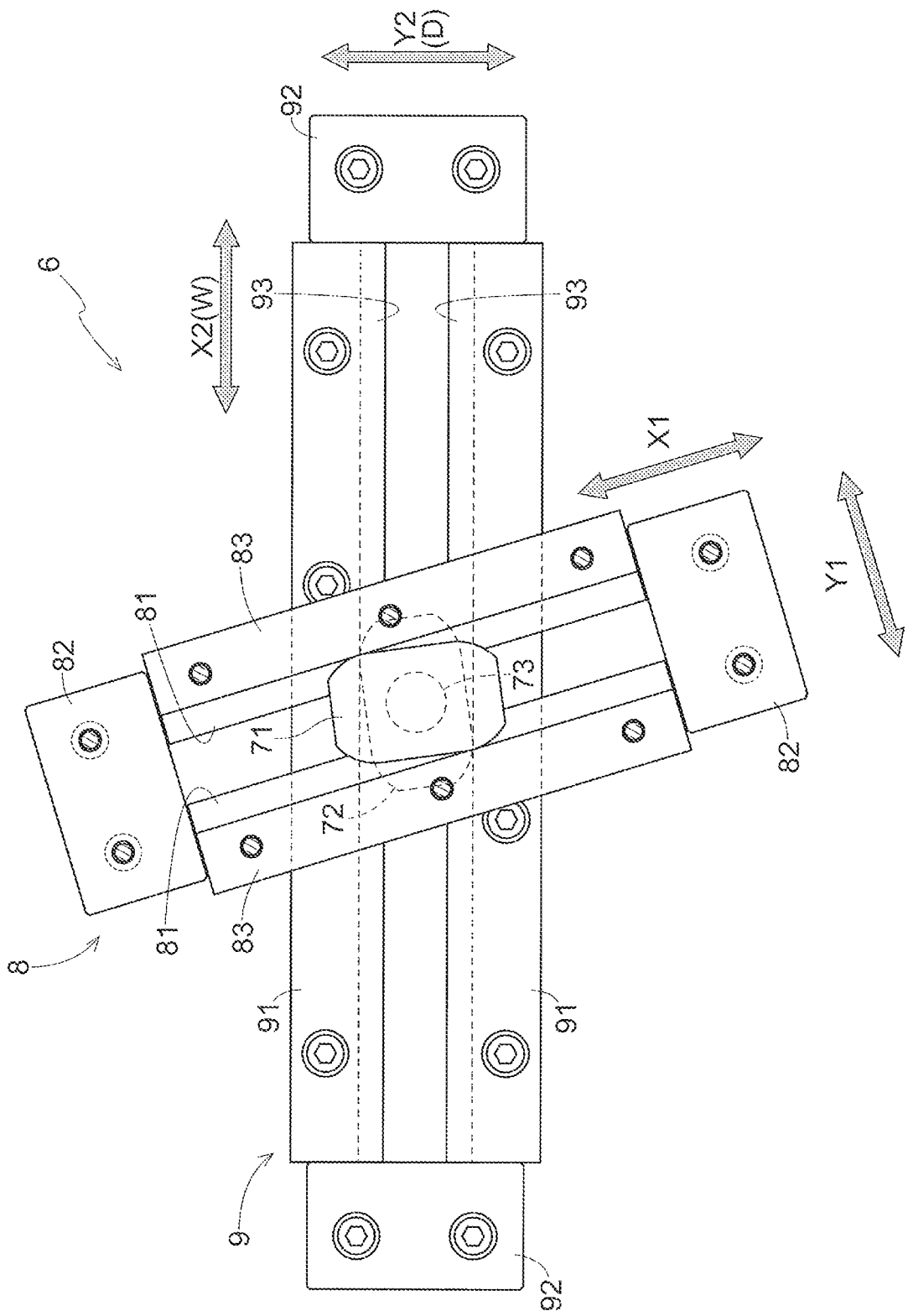
FIG. 15 is a diagram illustrating an example of the operation aspect of the guide mechanism

As shown in FIG. 15, if an external force is applied to the first member 1 in a circumferential direction around an axis along the vertical direction V, the first key guide 8 fixed to the first member 1 is rotated around the axis along the vertical direction V. Also, both of the pair of first horizontal guide portions 81 of the first key guide 8 abut against the first key 71. When the first key guide 8 is further rotated, the first key 71 is also rotated together with the first key guide 8, and the second key 72 coupled to the first key 71 abuts against both of the pair of second horizontal guide portion 91 of the second key guide 9. Accordingly, the first key guide 8 is prevented from further rotating.

In this way, when both of the pair of first horizontal guide portions 81 abut against the first key 71, and the second key 72 abuts against both of the pair of second horizontal guide portions 91, a state is realized in which the first key guide 8 is rotated to the furthermost position. Note that FIG. 15 shows a state in which the first key guide 8 is rotated to the farthermost position on one side in the circumferential direction (counterclockwise direction in FIG. 15) around an axis along the vertical direction V, and a state in which the first key guide 8 is rotated to the farthermost position on the other side in the circumferential direction (clockwise direction in FIG. 15) around the axis extending in the vertical direction V is omitted from FIG. 15.

Figure 16:
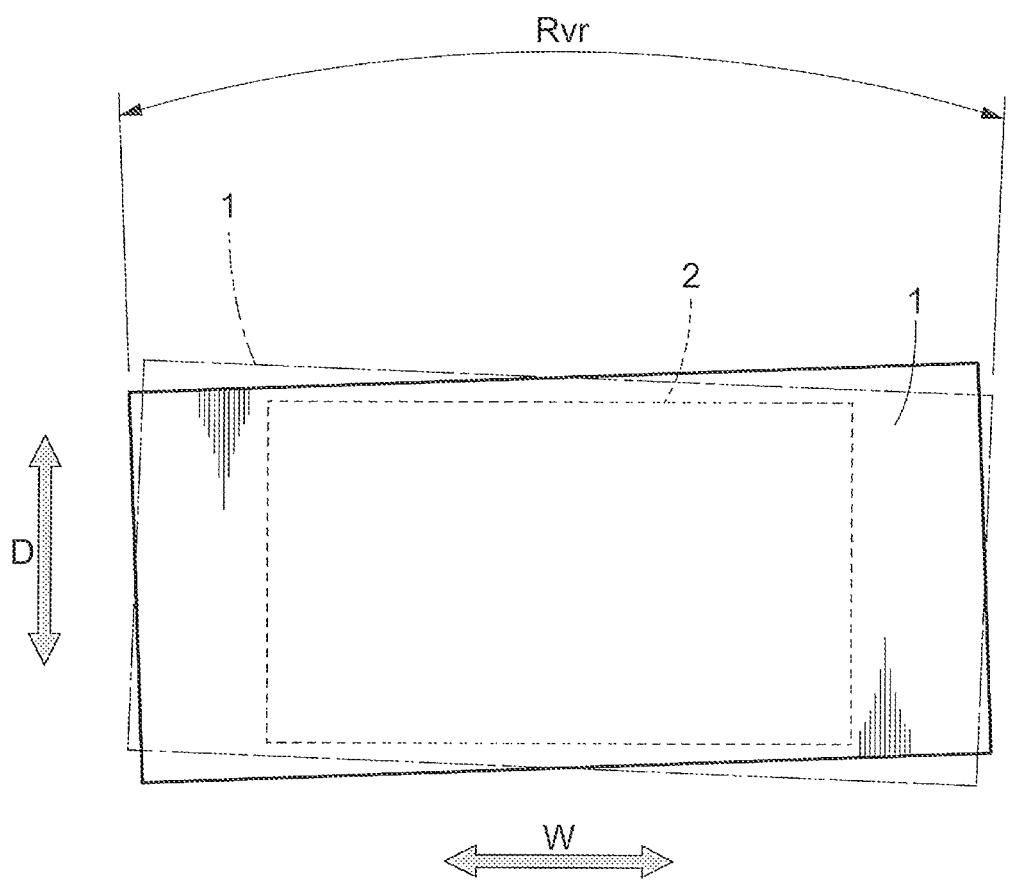
FIG. 16 is a diagram illustrating a vertical axis rotation range of the first member according to the embodiment.

In this way, as shown in FIG. 16, the first member 1 is rotatable within a predetermined vertical axis rotation range Rvr extending around an axis along the vertical direction V.

That is to say, the guide mechanisms 6 are configured to limit the relative movement of the first member 1 with respect to the second member 2 within the predetermined vertical axis rotation range Rvr extending around an axis along the vertical direction V. Note that the vertical axis rotation range Rvr is a range that corresponds to the first horizontal clearance C1$h$ (see FIG. 9) formed between each of the pair of first horizontal guide portions 81 and the first key 71 in the first orthogonal direction Y1, and to the second horizontal clearance C2$h$ (see FIG. 8) formed between each of the pair of second horizontal guide portions 91 and the second key 72 in the second orthogonal direction Y2. Accordingly, the first horizontal clearance C1$h$ and the second horizontal clearance C2$h$ are set based on the vertical axis rotation range Rvr.

Figure 17:
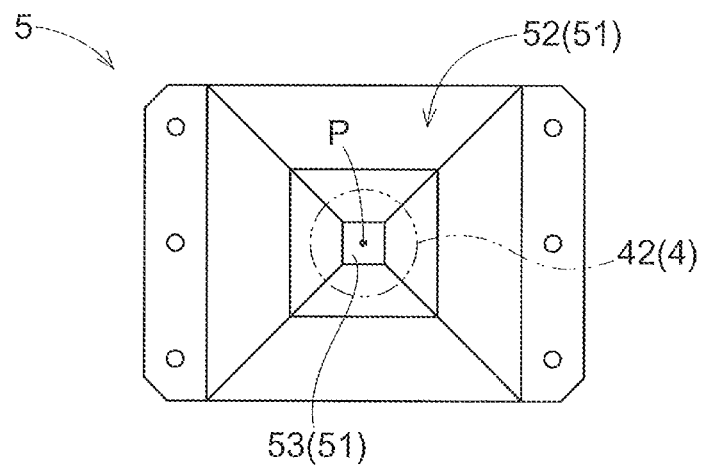
FIG. 17 is a bottom view illustrating an opposing portion according to another embodiment.
Figure 18:
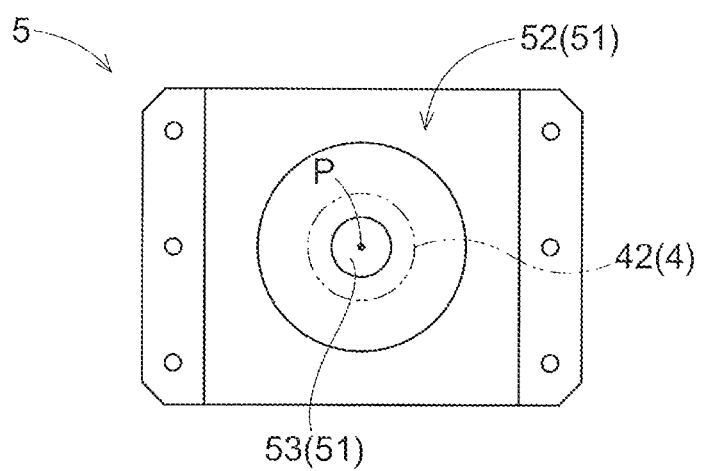
FIG. 18 is a bottom view illustrating an opposing portion according to yet another embodiment.

Other Embodiments (1) In the above-described embodiment, in the configuration in which the inclined surface 52 has sides having different sizes in two directions that are orthogonal to each other in the horizontal direction, as an example, a configuration has been described in which the inclined surface 52 includes a plurality of long regions 52L aligned in the long direction L, and a plurality of short regions 52S aligned in the short direction S, and the number of the long regions 52L is larger than the number of the short regions 52S (see FIG. 4). However, the present invention is not limited to such a configuration, and as shown in FIGS. 17 and 18, the inclined surface 52 may have the same sizes in the two directions that are orthogonal to each other in the horizontal direction. As shown in FIG. 17, the inclined surface 52 may also be configured such that the same number of regions are aligned in both of the two directions that are orthogonal to each other in the horizontal direction.

(2) In the above-described embodiment, a configuration in which the inclined surface 52 has a pyramid surface shape (see FIG. 4) has been described as an example. However, the present invention is not limited to such a configuration, and as shown in FIG. 18, the inclined surface 52 may has a conical surface shape. In the example shown in FIG. 18, similar to the example shown in FIG. 17, the inclined surface 52 has a configuration in which the same number of regions are aligned in both of the two directions that are orthogonal to each other in the horizontal direction. The inclined surface 52 may also have a spherical surface shape.

(3) In the above-described embodiment, a configuration in which the inclined surface 52 is formed so that the inclination angle θ increases while extending outward in the horizontal direction from the reference position P has been described as an example. However, the present invention is not limited to such a configuration, and the inclined surface 52 may be formed so as to have a uniform inclination angle θ over the entire area of the inclined surface 52. Alternatively, the inclined surface 52 may also be set such that the inclination angle θ is the largest in the vicinity of the reference position P, so that an external force for causing the first member 1 in the initial position to start moving relative to the second member 2 is larger than an external force for causing the first member 1 located at a position other than the initial position to start moving relative to the second member 2.

(4) In addition to the description above, the inclined surface 52 can be formed with flat surfaces or curved surfaces that have various inclination angles θ, or a combination thereof. Accordingly, it is possible to suitably set the moving direction and moving distance of the first member 1 from the initial position, and the magnitude of the restoring force for returning the first member 1 to the initial position, and the like, according to a purpose, a required function, and the like. For example, a configuration is also possible in which the inclined surface 52 has different inclination angles θ for regions in a circumferential direction around the reference position P when viewed in a plane view. In this case, because the sphere 42 is likely to move to a circumferential region for which a large inclination angle θ is set, and the sphere 42 is not likely to move to a circumferential region for which a small inclination angle θ is set, it is possible to set a direction in which the first member 1 is likely to move relative to the second member 2, and a direction in which the first member 1 is not likely to move relative to the second member 2. Also, for example, a groove in which the sphere 42 can roll may be formed in the inclined surface 52. Such a groove can be formed in various directions, for example, extending radially from the reference position P, or surrounding the reference position P. If such a groove is provided, the sphere 42 will roll along the groove, and it is thus possible to make the first member 1 likely to move in a specific direction (direction in which the groove extends).

(5) In the above-described embodiment, a configuration in which the opposing portion 5 is fixed to the first member 1, and the holding portion 41 is fixed to the second member 2 has been described as an example. However, the present invention is not limited to such a configuration, and the holding portion 41 may be fixed to the first member 1, and the opposing portion 5 may be fixed to the second member 2.

(6) In the above-described embodiment, a configuration in which the first key guide 8 is fixed to the first member 1, and the second key guide 9 is fixed to the second member 2 has been described as an example. However, the present invention is not limited to such a configuration, and the first key guide 8 may be fixed to the second member 2, and the second key guide 9 may be fixed to the first member 1.

(7) In the above-described embodiment, a configuration in which, when the first member 1 is in the initial position, the first direction X1 and the second direction X2 are orthogonal to each other has been described as an example. However, the present invention is not limited to such a configuration, and the first direction X1 and the second direction X2 may intersect with each other at an angel other than the orthogonal angle when the first member 1 is in the initial position. In this case, when the first member 1 is in the initial position, the first direction X1 does not match the second orthogonal direction Y2, and these directions intersect with each other. Also, the second direction X2 does not match the first orthogonal direction Y1, and these directions intersect with each other.

(8) The configurations disclosed in the above-described embodiments are applicable in combination with configurations disclosed in other embodiments so long as no inconsistency arises. With regard to the other configurations as well, the embodiments disclosed herein are in all respects as illustrative. Thus, various modifications may be appropriately made thereto without departing from the spirit of the present disclosure.

Overview of Embodiments

The following will describe overview of the floating unit described above.

The floating unit includes:

a first member;

a second member arranged so as to be opposed to the first member from below; and a floating mechanism that connects the first member and the second member so that the first member moves relative to the second member in a horizontal direction and a vertical direction, and the first member rotates relative to the second member around an axis along the vertical direction;

wherein the floating mechanism includes:

a rolling portion that includes a holding portion fixed to one of the first member and the second member, and a sphere held by the holding portion so as to be rotatable in all directions; and an opposing portion that is fixed to the other one of the first member and the second member, and has an abutment surface that abuts against the sphere, the abutment surface includes an inclined surface that is formed, over the entire region of the abutment surface in a circumferential direction around a reference position, so as to come close to a sphere arrangement side, which is a side in the vertical direction on which the sphere is arranged, while extending outward in the horizontal direction from the reference position, and the rolling portion and the opposing portion are arranged so that a load having a component in the vertical direction acts on a portion in which the abutment surface abuts against the sphere.

According to this configuration, the rolling portion and the opposing portion that constitute the floating mechanism are arranged so as to be opposed to each other in the vertical direction between the first member and the second member in the vertical direction. Also, as a result of the sphere of the rolling portion rolling on the abutment surface of the opposing portion that has the inclined surface, the first member can move relative to the second member in the horizontal direction and the vertical direction, and the first member can rotate relative to the second member around an axis along the vertical direction. Here, the abutment surface has the above-described inclined surface, and a load having a component in the vertical direction acts on a portion in which the abutment surface abuts against the sphere. Accordingly, if the first member is moved relative to the second member from the initial position, and the sphere is in a state of being opposed to the inclined surface, a load will act on the sphere in a direction in which the first member returns to the reference position along the inclined surface. The floating mechanism thus generates a restoring force in a direction in which the first member is returned to the initial position. According to this configuration, the floating mechanism arranged between the first member and the second member in the vertical direction enables the first member to appropriately move relative to the second member, and can appropriately generate a restoring force for returning the first member to the initial position. Therefore, it is possible to suppress the size of the floating unit in the horizontal direction, as compared to a configuration in which the floating mechanism is aligned with the first member in the horizontal direction.

Also, as described above, since the rolling portion and the opposing portion are arranged between the first member and the second member in the vertical direction, it is easy to secure a large size of the abutment surface of the opposing portion in the horizontal direction. Accordingly, it is easy to secure a large movement range of the sphere on the abutment surface in the horizontal direction. That is to say, it is easy to secure a large relative movement range of the first member with respect to the second member in the horizontal direction.

Here, preferably, the inclined surface has a pyramid surface shape or a conical surface shape.

According to this configuration, it is possible to obtain an appropriate shape of the inclined surface.

Also, preferably, the inclined surface is formed so that an inclination angle increases while extending outward in the horizontal direction from the reference position, the inclination angle being an angle at which the inclined surface is inclined with respect to the horizontal direction toward the sphere arrangement side.

According to this configuration, the inclination angle of the inclined surface increases with the increasing distance from the reference position in the horizontal direction. Here, the sphere is more likely to roll on the inclined surface the larger the inclination angle of the inclined surface is. Therefore, according to this configuration, the restoring force in the direction in which the sphere returns to the reference position can increase with the increasing distance between the position of the sphere and the reference position of the inclined surface in the horizontal direction. In other words, a configuration is possible in which the restoring force increases with the increasing amount of displacement of the first member with respect to the second member in the horizontal direction. Accordingly, even if the first member is largely moved relative to the second member, it is possible to appropriately return the first member to the initial position.

In the configuration in which the inclined surface is formed so that an inclination angle increases while extending outward in the horizontal direction from the reference position, preferably, the inclined surface has sides having different sizes in two directions that are orthogonal to each other in the horizontal direction, and letting, of the two directions, the direction in which the inclined surface has the larger sides be a long direction, and the direction in which the inclined surface has the smaller sides be a short direction, the inclined surface includes a plurality of long regions that are aligned in the long direction, and a plurality of short regions that are aligned in the short direction, the plurality of long regions each have a given inclination angle, and the inclination angles are different from each other, the plurality of short regions each have a given inclination angle, and the inclination angles are different from each other, and the number of the long regions is larger than the number of the short regions.

According to this configuration, even if the relative movement range of the first member with respect to the second member in the horizontal direction varies according to the moving direction, it is possible to obtain an appropriate restoring force for each direction.

Also, preferably, the floating unit further includes a guide mechanism configured to guide relative movement of the first member with respect to the second member, wherein letting a specific direction oriented along the horizontal direction be a first direction, and a direction that is oriented along the horizontal direction and intersects with the first direction be a second direction, the guide mechanism is configured to limit the relative movement of the first member with respect to the second member within a predetermined first movement range extending in the first direction, within a predetermined second movement range extending in the second direction, and within a predetermined vertical movement range extending in the vertical direction, and limit the relative rotation of the first member with respect to the second member within a predetermined vertical axis rotation range extending around an axis along the vertical direction.

According to this configuration, it is possible to prevent the first member from moving relative to the second member beyond a range in which they are movable relative to each other, that is, it is possible to prevent a case where the sphere moves beyond an outer edge of the abutment surface, for example.

In the configuration of the floating unit that further includes the guide mechanism, preferably, the guide mechanism includes:

a first key;
a second key that is aligned with the first key in the vertical direction, and is coupled to the first key;
a first key guide fixed to one of the first member and the second member; and
a second key guide fixed to the other one of the first member and the second member, letting a direction that is oriented along the horizontal direction and is orthogonal to the first direction be a first orthogonal direction, and a direction that is oriented along the horizontal direction and is orthogonal to the second direction be a second orthogonal direction, the first key guide includes:
a pair of first horizontal guide portions that are provided on two sides of the first key in the first orthogonal direction, and are arranged at positions at which the pair of first horizontal guide portions overlap the first key when viewed in a first orthogonal direction view along the first orthogonal direction, the pair of first horizontal guide portions being formed extending in the first direction;
a pair of first horizontal confinement portions that are provided on two sides of the first key in the first direction, and are arranged at positions at which the pair of first horizontal confinement portions overlap the first key when viewed in a first direction view along the first direction; and
a first vertical confinement portion that is provided on a side of the first key facing toward the second key in the vertical direction, and is arranged at a position at which the first vertical confinement portion overlaps the first key when viewed in a vertical direction view along the vertical direction, the second key guide includes:
a pair of second horizontal guide portions that are provided on two sides of the second key in the second orthogonal direction, and are arranged at positions at which the pair of second horizontal guide portions overlap the second key when viewed in a second orthogonal direction view along the second orthogonal direction, the pair of second horizontal guide portions being formed extending in the second direction;
a pair of second horizontal confinement portions that are provided on two sides of the second key in the second direction, and are arranged at positions at which the pair of second horizontal confinement portions overlap the second key when viewed in a second direction view along the second direction; and
a second vertical confinement portion that is provided on a side of the second key facing toward the first key in the vertical direction, and is arranged at a position at which the second vertical confinement portion overlaps the second key when viewed in the vertical direction, a first horizontal clearance is formed between each of the pair of first horizontal guide portions and the first key in the first orthogonal direction, a first movement clearance is formed between each of the pair of first horizontal confinement portions and the first key in the first direction, the first movement clearance being based on the first movement range, a first vertical clearance is formed between the first vertical confinement portion and the first key in the vertical direction, a second horizontal clearance is formed between each of the pair of second horizontal guide portions and the second key in the second orthogonal direction, a second movement clearance is formed between each of the pair of second horizontal confinement portions and the second key in the second direction, the second movement clearance being based on the second movement range, a second vertical clearance is formed between the second vertical confinement portion and the second key in the vertical direction, a sum of the first vertical clearance and the second vertical clearance is set based on the vertical movement range, and the first horizontal clearance and the second horizontal clearance are set based on the vertical axis rotation range.

According to this configuration, the first key can perform relative movement between the pair of first horizontal guide portions in the first direction along the first horizontal guide portion, within a range of the first movement clearance formed between each of the pair of first horizontal confinement portions and the first key in the first direction. Accordingly, the first member can move relative to the second member in the first direction within the first movement range.

Also, the second key can perform relative movement between the pair of second horizontal guide portions in the second direction along the second horizontal guide portion, within a range of the second movement clearance formed between each of the pair of second horizontal confinement portions and the second key in the second direction. Accordingly, the first member can move relative to the second member in the second direction within the second movement range.

Furthermore, the first key can perform relative movement in the vertical direction, within a range of the first vertical clearance formed between the first vertical confinement portion and the first key in the vertical direction. Moreover, the second key can perform relative movement in the vertical direction, within a range of the second vertical clearance formed between the second vertical confinement portion and the second key in the vertical direction. Accordingly, the first member can move relative to the second member in the vertical direction within the vertical movement range.

Furthermore, the first key can perform relative rotation around an axis along the vertical direction, within a range of the first horizontal clearance formed between each of the pair of first horizontal guide portions and the first key in the first orthogonal direction. Moreover, the second key can perform relative rotation around an axis along the vertical direction, within a range of the second horizontal clearance formed between each of the pair of second horizontal guide portions and the second key in the second orthogonal direction. Accordingly, the first member can rotate relative to the second member around an axis along the in the vertical direction within the vertical axis rotation range.

As described above, according to this configuration, it is possible to allow the first member to move and rotate relative to the second member within an appropriate range, and appropriately limit these relative movement and relative rotation so that the first member and the second member do not move and rotate beyond the allowable ranges.

Also, preferably, at least three floating mechanisms are provided for one first member, the floating mechanisms are provided at positions that correspond to vertexes of a polygon surrounding a gravity center of the first member when viewed in a vertical direction view along the vertical direction.

According to this configuration, it is possible to support the first member in an appropriate orientation, while allowing the first member to move and rotate relative to the second member.

INDUSTRIAL APPLICABILITY

The technique according to this disclosure is applicable to a floating unit in which a first member is configured to be movable relative to a second member.

What is claimed is:
1. A floating unit comprising:
a first member;
a second member arranged so as to be opposed to the first member from below; and
a floating mechanism that connects the first member and the second member so that the first member moves relative to the second member in a horizontal direction and a vertical direction, and the first member rotates relative to the second member around an axis along the vertical direction;
wherein the floating mechanism comprises:
a rolling portion that comprises a holding portion fixed to one of the first member and the second member, and a sphere held by the holding portion so as to be rotatable in all directions; and
an opposing portion that is fixed to the other one of the first member and the second member, and has an abutment surface that abuts against the sphere,
wherein the abutment surface comprises an inclined surface that is formed, over the entire region of the abutment surface in a circumferential direction around a reference position, so as to come proximate to a sphere arrangement side, which is a side in the vertical direction on which the sphere is arranged, while extending outward in the horizontal direction from the reference position, and
wherein the rolling portion and the opposing portion are arranged so that a load having a component in the vertical direction acts on a portion in which the abutment surface abuts against the sphere.
2. The floating unit according to claim 1,
wherein the inclined surface has a pyramid surface shape or a conical surface shape.
3. The floating unit according to claim 1,
wherein the inclined surface is formed so that an inclination angle increases while extending outward in the horizontal direction from the reference position, the inclination angle being an angle at which the inclined surface is inclined with respect to the horizontal direction toward the sphere arrangement side.
4. The floating unit according to claim 3, wherein:
the inclined surface has sides having different sizes in two directions that are orthogonal to each other in the horizontal direction, and of the two directions, the direction in which the inclined surface has the larger sides be a long direction, and the direction in which the inclined surface has the smaller sides be a short direction,
the inclined surface comprises a plurality of long regions that are aligned in the long direction, and a plurality of short regions that are aligned in the short direction,
the plurality of long regions each have a given inclination angle, and the inclination angles are different from each other,
the plurality of short regions each have a given inclination angle, and the inclination angles are different from each other, and
the number of the long regions is larger than the number of the short regions.
5. The floating unit according to claim 1, further comprising:
a guide mechanism configured to guide relative movement of the first member with respect to the second member,
wherein a specific direction oriented along the horizontal direction is a first direction, and a direction that is oriented along the horizontal direction and intersects with the first direction is a second direction,
wherein the guide mechanism is configured to limit the relative movement of the first member with respect to the second member within a predetermined first movement range extending in the first direction, within a predetermined second movement range extending in the second direction, and within a predetermined vertical movement range extending in the vertical direction, and limit the relative rotation of the first member with respect to the second member within a predetermined vertical axis rotation range extending around an axis along the vertical direction.
6. The floating unit according to claim 5,
wherein the guide mechanism comprises:
a first key;
a second key that is aligned with the first key in the vertical direction, and is coupled to the first key;
a first key guide fixed to one of the first member and the second member; and
a second key guide fixed to the other one of the first member and the second member,
wherein a direction that is oriented along the horizontal direction and is orthogonal to the first direction is a first orthogonal direction, and a direction that is oriented along the horizontal direction and is orthogonal to the second direction be a second orthogonal direction,
the first key guide comprises:
a pair of first horizontal guide portions that are provided on two sides of the first key in the first orthogonal direction, and are arranged at positions at which the pair of first horizontal guide portions overlap the first key when viewed in a first orthogonal direction view along the first orthogonal direction, the pair of first horizontal guide portions being formed extending in the first direction;
a pair of first horizontal confinement portions that are provided on two sides of the first key in the first direction, and are arranged at positions at which the pair of first horizontal confinement portions overlap the first key when viewed in a first direction view along the first direction; and
a first vertical confinement portion that is provided on a side of the first key facing toward the second key in the vertical direction, and is arranged at a position at which the first vertical confinement portion overlaps the first key when viewed in a vertical direction view along the vertical direction, the second key guide comprises:
- a pair of second horizontal guide portions that are provided on two sides of the second key in the second orthogonal direction, and are arranged at positions at which the pair of second horizontal guide portions overlap the second key when viewed in a second orthogonal direction view along the second orthogonal direction, the pair of second horizontal guide portions being formed extending in the second direction;
- a pair of second horizontal confinement portions that are provided on two sides of the second key in the second direction, and are arranged at positions at which the pair of second horizontal confinement portions overlap the second key when viewed in a second direction view along the second direction; and
- a second vertical confinement portion that is provided on a side of the second key facing toward the first key in the vertical direction, and is arranged at a position at which the second vertical confinement portion overlaps the second key when viewed in the vertical direction, a first horizontal clearance is formed between each of the pair of first horizontal guide portions and the first key in the first orthogonal direction, a first movement clearance is formed between each of the pair of first horizontal confinement portions and the first key in the first direction, the first movement clearance being based on the first movement range, a first vertical clearance is formed between the first vertical confinement portion and the first key in the vertical direction, a second horizontal clearance is formed between each of the pair of second horizontal guide portions and the second key in the second orthogonal direction, a second movement clearance is formed between each of the pair of second horizontal confinement portions and the second key in the second direction, the second movement clearance being based on the second movement range, a second vertical clearance is formed between the second vertical confinement portion and the second key in the vertical direction, a sum of the first vertical clearance and the second vertical clearance is set based on the vertical movement range, and the first horizontal clearance and the second horizontal clearance are set based on the vertical axis rotation range.

7. The floating unit according to claim 1,
wherein at least three floating mechanisms are provided for one first member, and
wherein the floating mechanisms are provided at positions that correspond to vertexes of a polygon surrounding a gravity center of the first member when viewed in a vertical direction view along the vertical direction.

* * * * *